(12) United States Patent
Shkoury et al.

(10) Patent No.: US 12,489,298 B2
(45) Date of Patent: Dec. 2, 2025

(54) REGULATING POWER BETWEEN POWER SOURCES IN A PHOTOVOLTAIC POWER SYSTEM

(71) Applicant: Solaredge Technologies Ltd., Herzeliya (IL)

(72) Inventors: Roy Shkoury, Hadera (IL); Ohad Gidon, Netanya (IL); Gideon Eitan, Haifa (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/768,812

(22) Filed: Jul. 10, 2024

(65) Prior Publication Data

US 2024/0364115 A1   Oct. 31, 2024

Related U.S. Application Data

(63) Continuation of application No. 18/150,302, filed on Jan. 5, 2023, now Pat. No. 12,068,609.

(60) Provisional application No. 63/297,452, filed on Jan. 7, 2022.

(51) Int. Cl.
*H02J 3/38* (2006.01)
*H02J 3/46* (2006.01)
*H02M 3/156* (2006.01)
*H02M 7/537* (2006.01)

(52) U.S. Cl.
CPC .............. *H02J 3/381* (2013.01); *H02J 3/46* (2013.01); *H02M 3/156* (2013.01); *H02M 7/537* (2013.01); *H02J 2300/26* (2020.01)

(58) Field of Classification Search
CPC ...... H02J 3/38; H02J 3/381; H02J 3/46; H02J 2300/26; H02M 3/156; H02M 7/537
See application file for complete search history.

(56) References Cited

U.S. PATENT DOCUMENTS

| 8,548,391 B2 | 10/2013 | Zuckerman et al. |
| 8,686,333 B2 | 4/2014 | Arditi et al. |
| 2011/0208372 A1 | 8/2011 | Hansen et al. |

FOREIGN PATENT DOCUMENTS

WO   2020/133056 A1   7/2020

OTHER PUBLICATIONS

May 24, 2023—EP Search Report—EP App. No. 23150476.2.

*Primary Examiner* — Robert L Deberadinis
(74) *Attorney, Agent, or Firm* — Banner & Witcoff, Ltd.

(57) ABSTRACT

A power system may comprise a plurality of power sources, each connected to a corresponding power regulator. The power regulators may be connected in series or in parallel, and may form a string. Each power regulator may comprise input terminals connected to the corresponding power source, output terminals, and a power converter that may be configured to convert input power from the corresponding power source to output power. The power regulator may further comprise a regulator communications module that may be configured to receive a power regulation indication relating to regulating an operational characteristic of the power regulator. The regulator controller may be configured to instruct the power converter to increase or decrease the regulator operational characteristic based on the power regulation indication, and based on power production characteristics of the power regulator.

20 Claims, 27 Drawing Sheets

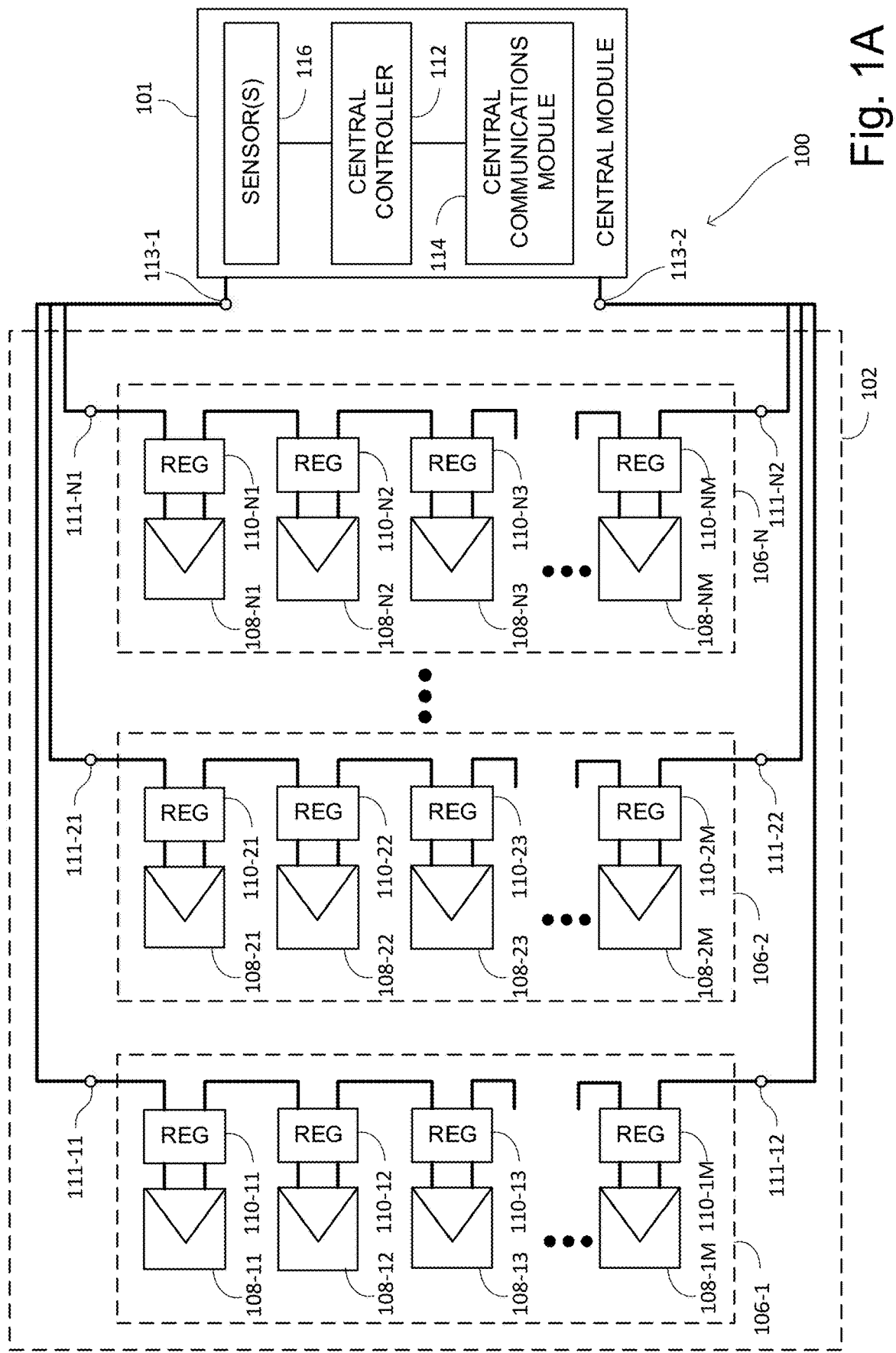

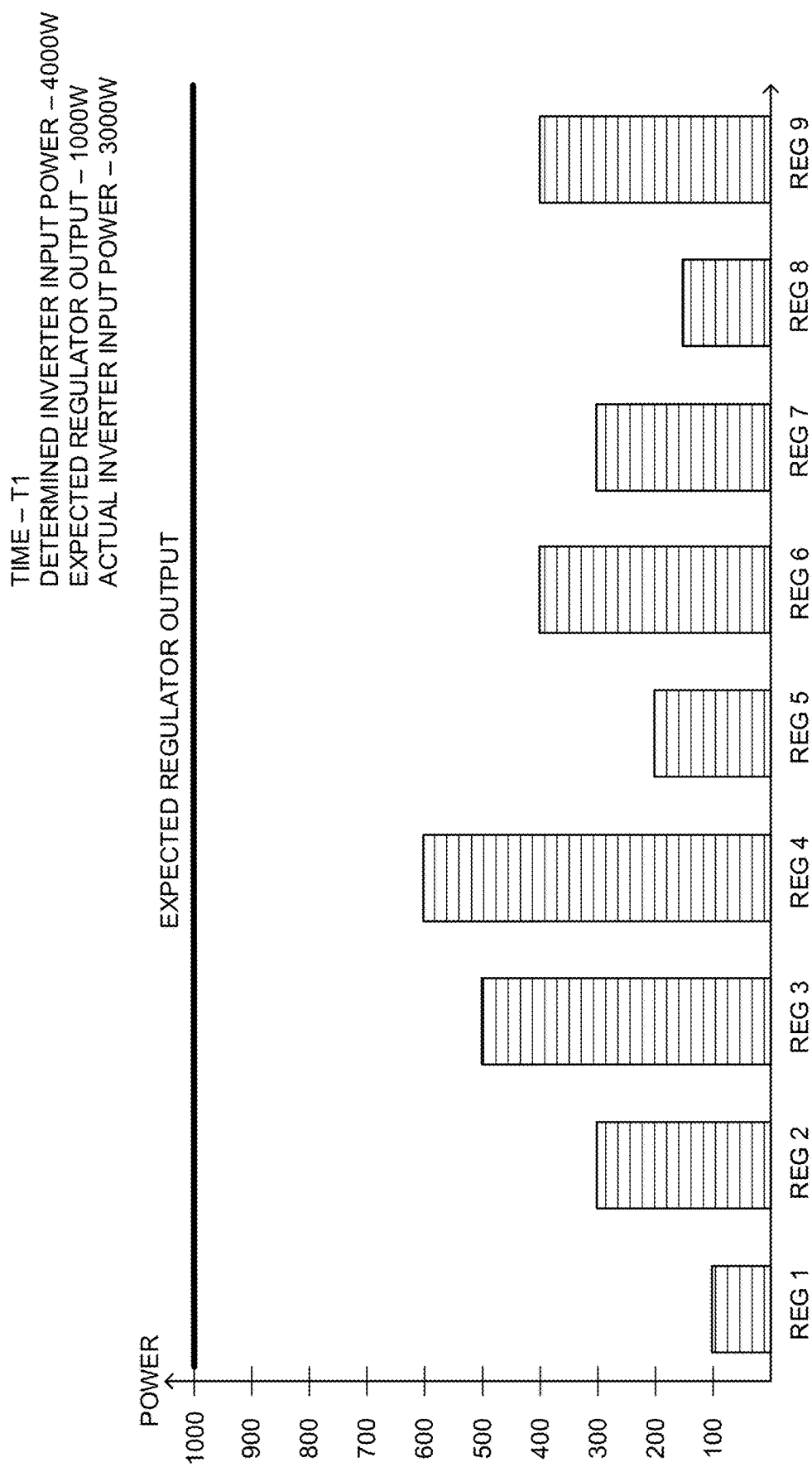

REGULATING POWER BETWEEN POWER SOURCES IN A PHOTOVOLTAIC POWER SYSTEM

CROSS-REFERENCE TO RELATED APPLICATIONS

This application is a continuation of U.S. application Ser. No. 18/150,302, filed Jan. 5, 2023, which claims the benefit of U.S. Provisional Application No. 63/297,452, filed on Jan. 7, 2022. The entire disclosures of the foregoing applications are incorporated by reference in their entireties.

BACKGROUND

The present disclosure relates generally to photovoltaic power systems. More specifically, aspects of the disclosure provide systems, devices, and methods for regulating power production between power sources in a photovoltaic power system.

Some power systems may comprise a plurality of power sources. In such power systems, the power production of the different power sources might not be balanced (e.g., some power sources may produce more power than others). Uneven power production may occur in power systems which produce more power than may be required by the application (e.g., a home, a factory) that is connected to the power system (e.g., oversized system or temporary reduction in power requirements). In some instances, a power system may comprise a plurality of parallel connected strings, wherein each string may comprise a plurality of connected power sources. An uneven distribution of power production may result from differences in the configuration of each string (e.g., a number of power sources in each string may vary, a length of a wire connecting the strings to a central module may vary, the different lengths of wire may result in different voltage drops across the wires, the differing voltage drops may result in different strings producing different voltages, or the like). In photovoltaic power sources, installation of the photovoltaic power sources may also result in an uneven distribution of power production.

SUMMARY

The following is a simplified summary of some of inventive concepts for illustrative purposes only. This summary is not an extensive overview and is not intended to identify key or critical elements of the present disclosure. This summary is not intended to limit or constrain the present disclosure.

A power system may comprise a plurality of power sources, which may be configured to generate power. A power system may further comprise a string, which may comprise a plurality of power regulators connected in series or in parallel. Each power regulator may comprise input terminals, output terminals, a power converter, a regulator communications module, and a regulator controller. The input terminals may be connected to a corresponding power source. The power converter may be configured to convert input power, from the corresponding power source, to output power. The regulator communications module may be configured to receive at least one regulation signal. The regulation signal may indicate the regulation of an operational characteristic of a power regulator. The regulation signal may be a broadcast signal or a multicast signal. The regulator controller may be connected to the power converter and the regulator communications module. The regulator controller may control the power converter. In particular, the regulator controller may increase or decrease the operational characteristic of the power regulator based on the power regulation indication and further based on power production characteristics of the power regulator. The power converter may adjust the power output of a power regulator to remedy uneven distribution of power throughout the power system. The power regulation indication may be at least one of a required regulator output, an increase indication, or a decrease indication.

A method may comprise regulating power produced by a plurality of power sources in an array of power sources. The array of power sources may comprise a plurality of strings connected in parallel, where each string may comprise a plurality of power regulators connected in series or in parallel. Each power source in the array of power source may be connected to a corresponding power regulator. The method may comprise the steps of determining a power regulation indication for regulating output power of the plurality power regulators in the array of power sources and transmitting a regulation signal as a broadcast signal or a multicast signal to at least some of the power regulators in the array of power sources. The regulation signal may correspond to the power regulation indication. The method may further include the step of increasing, decreasing or maintaining at least one output characteristic of each power regulator for each power regulator that received the regulation signal. The increasing, decreasing or maintaining of at least one output characteristic may be based on the received regulation signal, and based on power production characteristics of the power regulator. The power regulation indication may be at least one of: required regulator output, an increase indication, or a decrease indication.

A system may comprise a power regulator in a plurality (e.g., array) of power sources, which may comprise input terminals, output terminals, a power converter, a regulator communications module and a regulator controller. The input terminals may be configured to be connected to a corresponding power source of the plurality of power sources. The power converter may be configured to convert input power from the corresponding power source to output power. The regulator communications module, may be configured to receive at least one regulation signal. The regulation signal may correspond to a power regulation indication. The power regulation indication may relate to regulating an operational characteristic of the power regulator. The regulation signal may be one of a broadcast signal or a multicast signal. The regulator controller may be connected to the power converter and the regulator communications module. The regulator controller may be configured to control the power converter to either increase or decrease the regulator operational characteristic of the power regulator based on the power regulation indication, and based on power production characteristics of the power regulator. The power regulation indication may be at least one of: required regulator output, an increase indication, or a decrease indication.

An array of power sources may comprise a plurality of strings and a plurality of power regulators. Each string, of the plurality of strings, may comprise power sources, of the plurality of power sources. Each power regulator within the plurality of power regulators may comprise input terminals, output terminals, a power converter, a regulator communications module, and a regulator controller. The input terminals may be configured to connect to a corresponding power source of the plurality of power sources. The power converter may be configured to convert input power from the corresponding power source to output power. The regulator communications module, may be configured to receive at least one regulation signal. The regulation signal may correspond to a power regulation indication. The power regulation indication may relate to regulating an operational characteristic of the power regulator. The regulation signal may be one of a broadcast signal or a multicast signal. The regulator controller may be connected to the power converter and the regulator communications module. The regulator controller may be configured to control the power converter to either increase or decrease the regulator operational characteristic of the power regulator based on the power regulation indication, and based on a power production characteristic of the power regulator. The power regulation indication may be at least one of: required regulator output, an increase indication, or a decrease indication.

The power regulator may store a characteristic curve defining a correspondence between regulator operational characteristics of the power regulator. The characteristic curve may comprise a droop over an operating range of the power regulator. The regulator controller may control the power converter to increase, decrease, or maintain the regulator operational characteristic at least based on the characteristics curve.

BRIEF DESCRIPTION OF THE DRAWINGS

The present disclosure is illustrated by way of example and is not limited in the accompanying figures in which like reference numerals indicate similar elements and in which:

FIGS. 1A and 1B illustrate example photovoltaic power systems in which power harvesting may be regulated, in accordance with aspects of the disclosure herein.

FIGS. 3A-3E illustrate example graphical representations of power regulation in an array of power sources, in accordance with aspects of the disclosure herein.

DETAILED DESCRIPTION

In the following description of the various embodiments, reference is made to the accompanying drawings, which form a part hereof, and in which are shown, by way of illustration, various embodiments in which aspects of the discloser may be practiced. It is to be understood that other embodiments may be utilized, and structural and functional modifications may be made without departing from the scope of the present disclosure.

The present disclosure includes devices, systems, and methods for regulating power production in an array of power sources. According to features of the disclosure herein, a central module (e.g., an inverter) may determine a power regulation indication that may be used to regulate power between power sources. Regulating the power between the power sources may comprise regulating output power from power regulators in the array of power sources. The power regulation indication may specify an output characteristic of a power regulator connected to each power source. The power regulation indication may be an increase indication, which may instruct the power regulator to increase the operational characteristic of the power regulator. Additionally or alternatively, the power regulation indication may be a decrease indication, which may instruct the power regulator to decrease the operational characteristic of the power regulator. The central module may transmit the power regulation indication to the power regulators in the array of power sources. Power regulation according to the present disclosure may also employ droop curve techniques to reduce a difference between the operational characteristics of the power regulators.

Figure 1B:
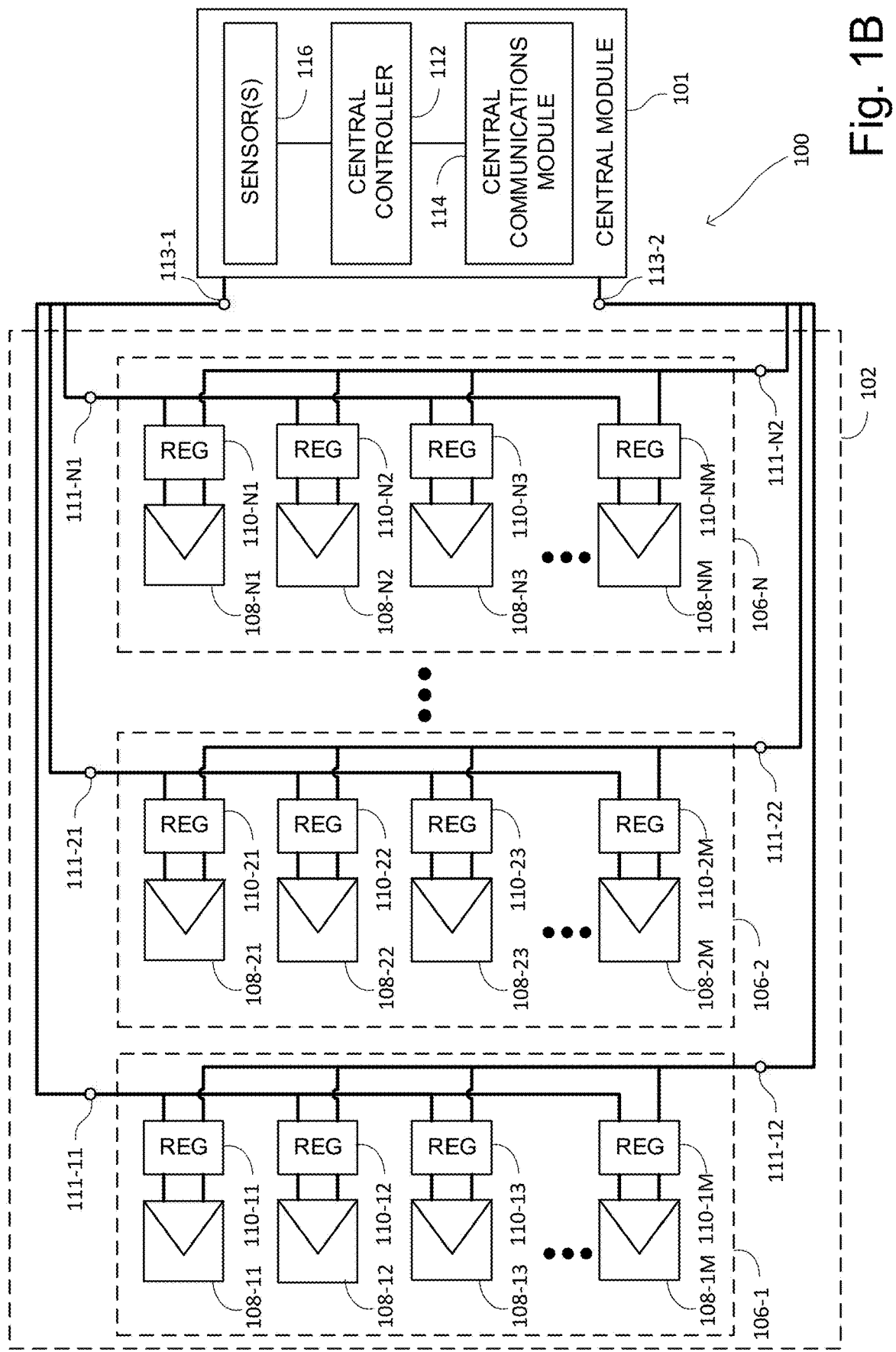

Reference is now made to FIGS. 1A and 1B, which are example illustrations of a power system 100, in which power harvesting may be regulated in accordance with aspects of the disclosure herein. Power system 100 may comprise a plurality of power sources (e.g., power sources 108), a plurality of power regulators (e.g., power regulators 110, which may be abbreviated as "REG" in FIGS. 1A and 1B), and a central module (e.g., central module 101). Each power source 108 (e.g., 108-11, . . . , 108-1M, 108-21, . . . , 108-2M, 108-N1, . . . , 108-NM) may be connected to an input terminal of a corresponding power regulator 110 (e.g., 110-11, . . . , 110-1M, 110-21, . . . , 110-2M, 110-N1, . . . , 110-NM). The plurality of power sources 108 and corresponding power regulators 110 may be arranged in an array of power sources (e.g., array of power sources 102). Array of power sources 102 may comprise one or more strings (e.g., strings 106-1, 106-2, . . . , 106-N).

String 106 may comprise a group of serially connected power regulators 110. As illustrated in FIG. 1A, string 106-1 may comprise a group of serially connected power regulators 110-11, 110-12, 110-13, . . . , 110-1M. As illustrated in FIG. 1A, string 106-2 may comprise a group of serially connected power regulators 110-21, 110-22, 110-23, . . . , 110-2M. As further illustrated in FIG. 1A, string 106-N may comprise a group of serially connected power regulators 110-N1, 110-N2, 110-N3, . . . , 110-NM.

String 106 may comprise a group of parallel connected power regulators 110. As illustrated in FIG. 1B, string 106-1 may comprise a group of parallel connected power regulators 110-11, 110-12, 110-13, . . . , 110-1M. As illustrated in FIG. 1B, string 106-2 may comprise a group of parallel connected power regulators 110-21, 110-22, 110-23, . . . , 110-2M. As further illustrated in FIG. 1B, string 106-N may comprise a group of parallel connected power regulators 110-N1, 110-N2, 110-N3, . . . , 110-NM. In FIGS. 1A and 1B, strings 106-1, 106-2, 106-N may be connected in parallel by connecting output terminals 111-11, 111-21, . . . , 111-N1 of strings 106-1, 106-2, . . . , 106-N, respectively, to input terminal 113-1 of central module 101, and by connecting output terminals 111-12, 111-22 and 111-N2 of strings 106-1, 106-2, . . . , 106-N, respectively, to input terminal 113-2 of central module 101 (e.g., an inverter or a combiner).

Central module 101 may comprise a central controller 112, a central communication module 114, sensor(s) 116, and input terminals 113-1 and 113-2. Central controller 112 may be connected to central communication module 114. Central controller 112 may be connected to sensor(s) 116. Array of power sources 102 may be connected to central module 101 by connecting output terminals 111 of strings 106 with input terminals 113 of central module 101. For example, input terminal 113-1 may be connected to output terminals 111-11, 111-21, . . . , 111-N1 of strings 106-1, 106-2, . . . , 106-N respectively. Input terminal 113-2 may be connected to output terminals 111-12, 111-22, . . . , 111-N2 of strings 106-1, 106-2, . . . , 106-N respectively. Central module 101 may be embodied in an inverter described below in conjunction with FIG. 12, or a combiner as described below in conjunction with FIG. 13. Sensors(s) 116 may be one or more voltage sensors, one or more current sensors, one or more temperature sensors configured to measure various characteristics of central module 101.

Figure 1C:
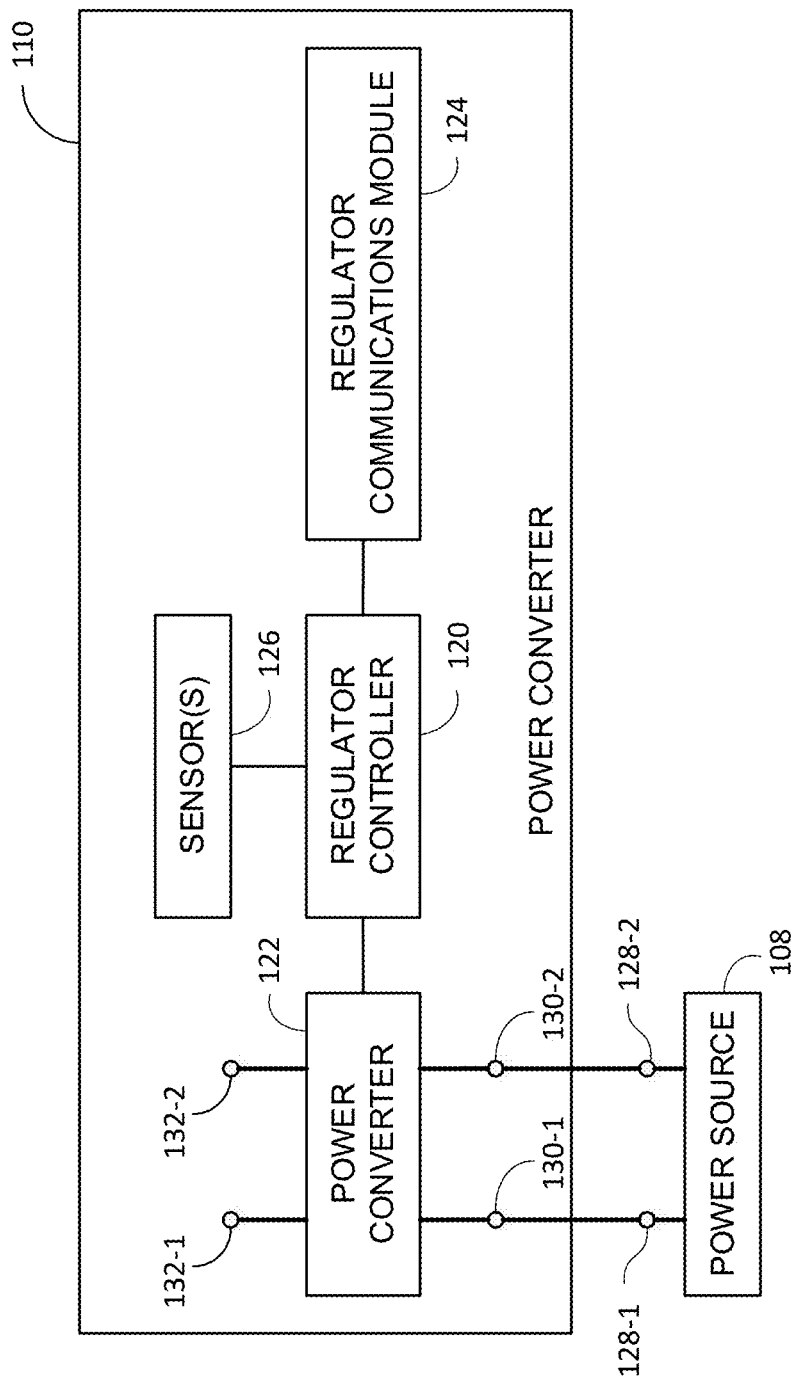
FIG. 1C illustrates example components of a power regulator with which power harvesting may be regulated, in accordance with aspects of the disclosure herein.
Figure 13:
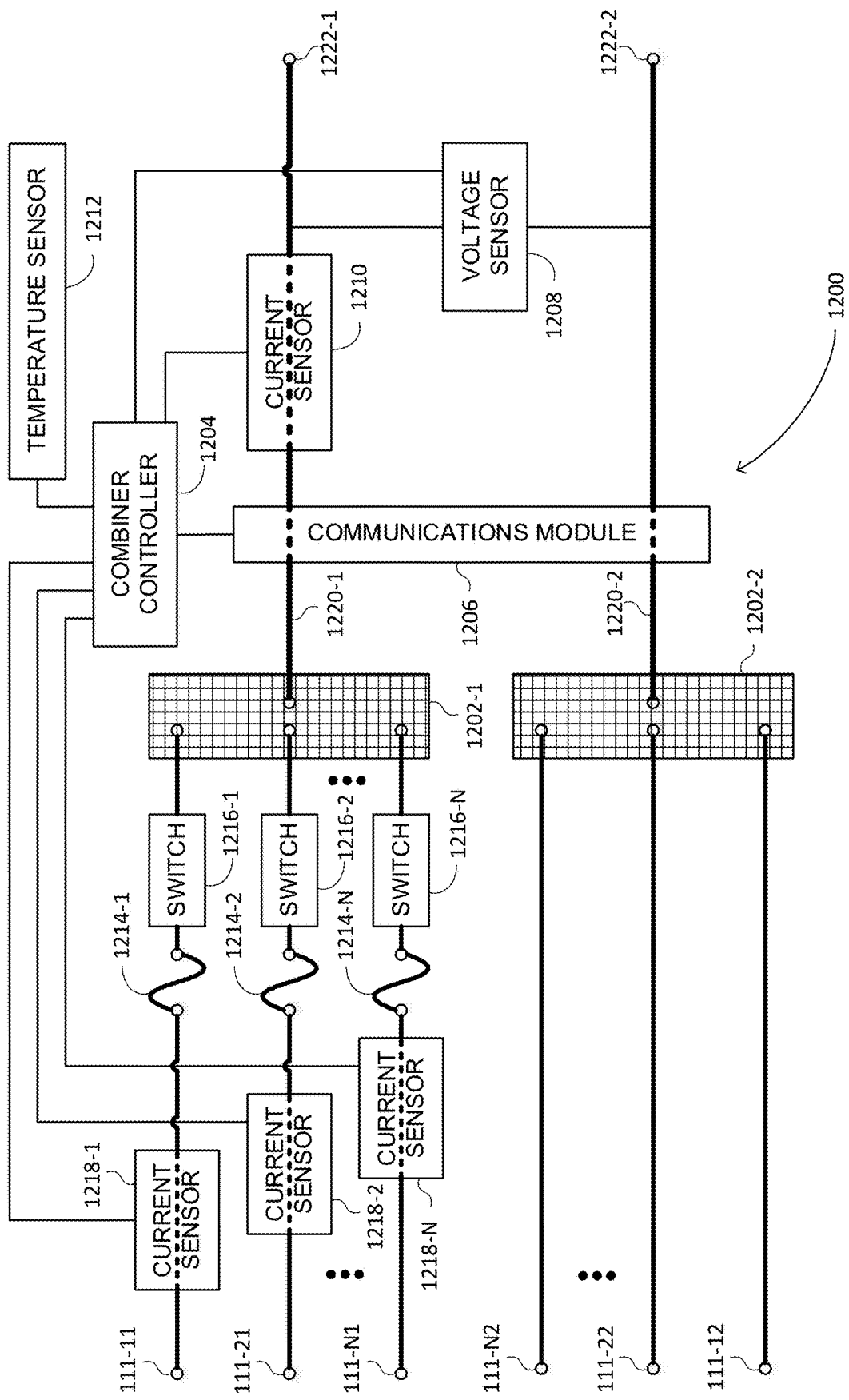
FIG. 13 illustrates an example in which a central module is implanted as a combiner, in accordance with aspects of the disclosure herein.
Figure 14:
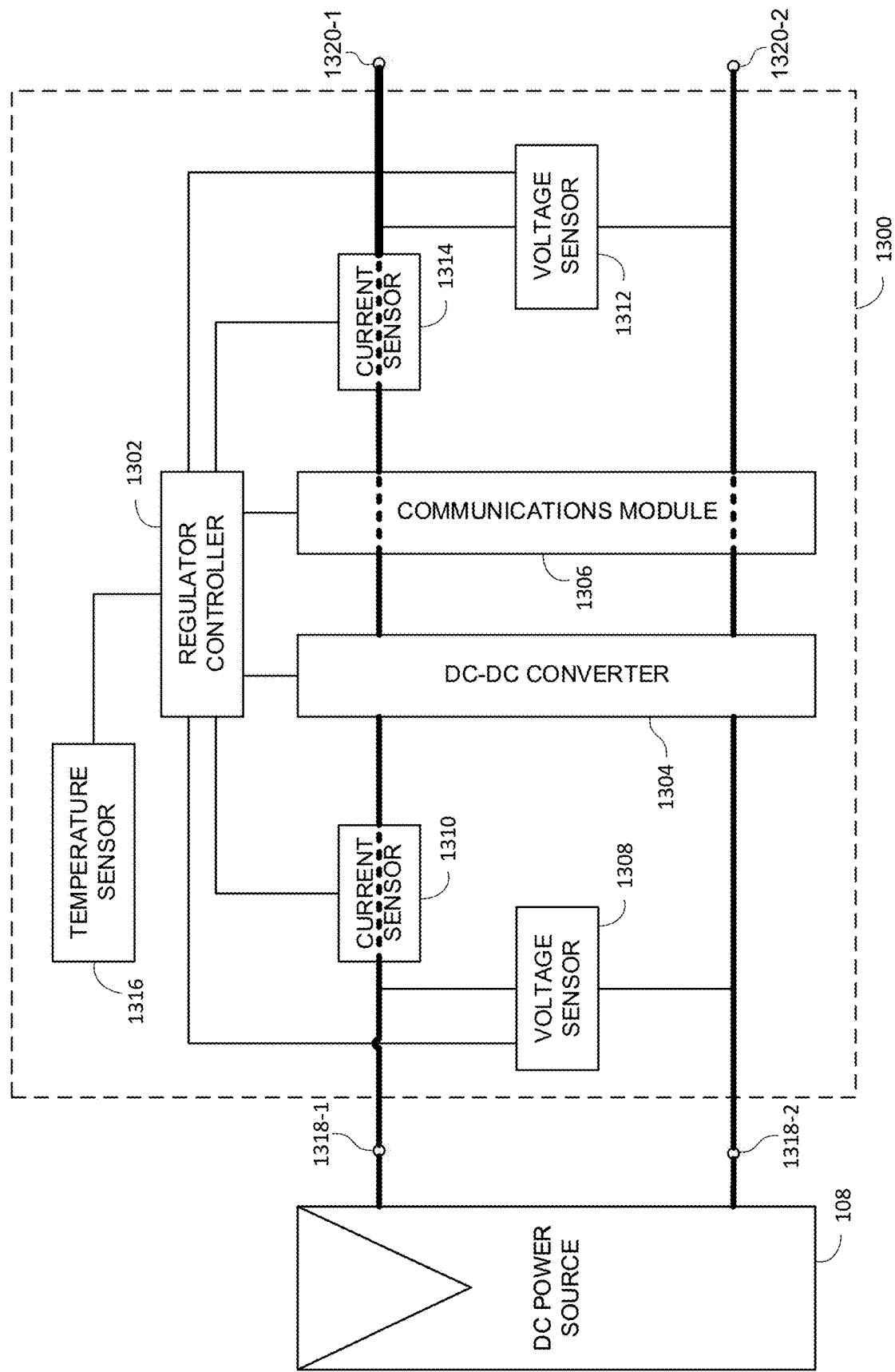
FIG. 14 illustrates an example of a power regulator which comprises a DC-DC converter, in accordance with aspects of the disclosure herein.

Referring to FIG. 1C, each power regulator 110 may comprise regulator controller 120, power converter 122, regulator communications module 124, and sensors(s) 126. As illustrated in FIG. 1C, regulator controller 120 may be connected to power converter 122, regulator communications module 124, and sensor(s) 126. Power converter 122 may comprise power input terminals 130-1 and 130-2, and power output terminals 132-1 and 132-2. Power converter 122 may be a DC to DC (DC-DC) converter, a DC to AC (DC-AC) converter, an AC to AC (AC-AC) converter, or an AC to DC (AC-DC) converter. Output terminals 128-1 and 128-2 of power source 108 may be connected to power input terminals 130-1 and 130-2 of power converter 122, respectively. Power converter 122 may be configured to receive power from power source 108 at input terminals 130-1 and 130-2 of power converter 122 and to provide power at output terminals 132-1 and 132-2 of power converter 122. Sensors(s) 126 may be one or more of voltage sensors, current sensors, or temperature sensors configured to measure various characteristics of power regulator 110. FIG. 13 below relates to an example implementation of power regulator 110 which comprises a DC-DC converter. FIG. 14 below relates to an example implementation of power regulator 110 which comprises a DC-AC converter.

Each power source of the plurality of power sources 108 may be configured to generate electrical power at the output terminals (e.g., output terminals 128-1 and 128-2 of power source 108). Power source 108 may comprise a direct current (DC) power source, such as a photovoltaic module, a battery (e.g., a lithium ion battery, lead-acid batteries, solid-state batteries, a redox flow battery, or the like), a capacitor, or a fuel cell. Additionally or alternatively, power source 108 may comprise an alternating current (AC) power source, such as a wind turbine, a flywheel, or a fuel powered generator configured to generate AC power at the output terminal of power source 108. Power regulator 110 may receive and regulate power from power source 108. Power production between power regulators 110 in array of power sources 102 might not be evenly distributed between power sources 108. As mentioned above, the uneven distribution of power production may result in an increase in temperature (e.g., overheating) of some power regulators 110. The increase in temperature may result in an increase in losses and may increase the probability of regulator failure and damage (e.g., reduce the Mean Time Between Failures-MTBF), or may even result in fire. The uneven power production between power regulators 110 may result in under-utilization of the power available from power source 108. The uneven power production between power regulators 110 may result from variations in regulator operational characteristics of power regulator 110 (e.g., output voltage, output current, output power, operating temperature, power converter duty cycle, or any combination thereof).

To regulate the power harvesting between power regulators 110 in array of power sources 102, central controller 112 (e.g., an inverter) may be configured to determine a power regulation indication. The power regulation indication may be based on a comparison of one or more determined operational characteristics of power system 100 and one or more actual (e.g., measured) operational characteristics of power system 100. A determined operational characteristic may be one that is a designed, preprogrammed, predetermined, or calculated based a requirement of the system or based on measured parameters in the system. In some embodiments, the power regulation indication may be based on a comparison of the determined output power and the actual (e.g., measured) output power from power system 100. In some embodiments, the power regulation indication may be based on a comparison of the determined output voltage and the actual (e.g., measured) output voltage from power system 100. In some embodiments, the power regulation indication may be based on a comparison of the determined output current and the actual (e.g., measured) output current from power system 100. In examples where central module 101 is an inverter (e.g., inverter 1100 illustrated in FIG. 11), the determined and actual (e.g., measured) operational characteristics of power system 100 may relate to one or more determined and actual (e.g., measured) operational characteristics of inverter 1100 (e.g., determined inverter input power compared to actual (e.g., measured) inverter input power, determined inverter input voltage compared to actual (e.g., measured) inverter input voltage, or determined inverter input current compared to actual (e.g., measured) inverter input current, or any combination thereof). The term "compared to" herein may relate to either a difference or a ratio between the determined and the actual (e.g., measured) operational characteristics. The determined operational characteristics may depend on actual implementation of central module 101. The determined operational characteristics of power system 100 (e.g., determined inverter input power, determined inverter input current, determined inverter input voltage) may be based on a determined (e.g., required, specified, measured, maximum) level (e.g., of power, current, voltage) that power system 100 may be configured to produce for use by the application. In the case of more than one determined operational characteristic of power system 100 being employed (e.g., a combination of determined operational characteristics), the values of the different determined operational characteristics (e.g., voltage, current, power) may be normalized, and a sum of differences may be employed to combine the different determined operational characteristics (e.g., using an average or a weighted average of the values of the different determined operational characteristics).

The power regulation indication may relate to a regulator operational characteristic of power regulators 110 in array of power sources 102. As discussed in connection with FIGS. 3A to 3E, 4A to 4D, and 5 the power regulation indication may be an expected regulator output. A power regulation indication may be a change indication (e.g., an increase indication or a decrease indication) or a no-change indication, as illustrated in FIGS. 6A-6C. In some examples, the power regulation indication may relate to all power regulators 110, and central communications module 114 may broadcast a signal corresponding to the power regulation indication to all power regulators 110 in array of power sources 102. In some examples, the power regulation indication may relate to some of power regulators 110 (e.g., a group of power regulators 110 across one or more of strings 106-1, 106-2, . . . , 106-N), and central communications module 114 may transmit a multicast signal to the group of power regulators 110. In some examples, the power regulation indication may relate to one specific power regulator 110, and central communications module 114 may transmit a unicast signal to the one specific power regulator 110. The term "regulation signal" may relate to a signal corresponding to the power regulation indication transmitted from central module 101 to at least one power regulator 110.

Regulator communications module 124, in each one of power regulators 110, may be configured to receive a regulation signal. Based on the received regulation signal, and on at least one power production characteristic of power regulator 110, regulator controller 120 may control (e.g., instruct, provide a command, etc.) power converter 122 to increase, decrease, or maintain one or more of the regulator operational characteristics of power regulator 110. The regulator operational characteristics of power regulator 110 may be regulator output voltage, regulator output current, regulator output power, regulator operating temperature (e.g., case temperature, component or components temperature, ambient temperature within a regulator casing, and the like), power converter duty cycle, or any combination thereof. As further elaborated below, a power production characteristic of power regulator 110 may be a maximum power point (MPP) of a corresponding power source 108, maximum operating temperature, output increase function, or output decrease function. The power production characteristic of power regulator 110 may be a current versus voltage curve of power regulator 110 or a power versus voltage curve of power regulator 110, or any combination of the above mentioned power production characteristics.

Central communications module 114 of central module 101 may be configured to transmit signals to power regulators 110. Regulator communications module 124, of each one of power regulators 110, may be configured to receive signals from central module 101. Central communications module 114 may be further configured to receive signals from power regulators 110, and each one of regulator communications modules 124 may be further configured to transmit signals to central module 101. As such, regulator communications module 124 of power regulator 110 and central communications module 114 of central module 101 may be configured to communicate based on a transmission protocol defining the transmission frequency or frequencies, a modulation scheme (e.g., Amplitude shift keying—ASK, Frequency shift keying—FSK, Quadrature Phase Shift Keying—QPSK, Quadrature Amplitude Modulation—QAM), multiple access scheme (e.g., Time Division Multiple Access—TDMA, Frequency Division Multiple Access—FDMA, Code Division Multiple Access—CDMA, Carrier Sense Multiple Access—CSMA, Aloha), encoding/decoding schemes (e.g., Non Return to Zero—NRZ, Manchester coding, Block coding), or the like. The transmitted and received signals between central module 101 and power regulator 110 may contain information relating to the power production in power system 100.

Following the increase, decrease, or maintenance of the regulator operational characteristics of some or all of power regulators 110 based on the received power regulation indication, the power production between power regulators 110 in array of power sources 102 may be substantially balanced. The terms "balance of power production" or "distribution of power production" may describe differences in the regulator operational characteristics between power regulators 110 (e.g., power regulators within one of strings 106-1, 106-2, . . . , 106-N, or in array of power sources 102). The terms "balance of power production" and "distribution of power production" may describe a weighted distribution of power production, where power regulators 110 with higher MPPs may produce more power than power regulators 110 with lower MPPs (e.g., the distribution of power production may be fair). The terms "balance of power production" and "distribution of power production" may describe a weighted distribution of power production, where power regulators 110 with longer lifetimes may produce less power than power regulators 110 with shorter lifetimes. The term "lifetime" may be considered as equivalent to the "age" of the power regulator. In balanced power production, the differences in the regulator operational characteristics or operating temperature may be smaller than in unbalanced power production. Balanced power production may relate to (e.g., refer to) the standard deviation of the regulator operational characteristics of power regulators 110. In balanced (e.g., evenly distributed) power production, the standard deviation of the regulator operational characteristics of power regulators 110 may be smaller than in unbalanced (e.g., uneven) power production. Balanced power production may relate to (e.g., refer to) an average of differences between the totality of power regulators 110 and a selected reference power regulator 110 (e.g., a reference power regulator 110 selected from one of strings 106 or from array of power sources 102). In balanced (e.g., evenly distributed) power production, the average of the differences between the totality of power regulators 110 and the selected reference power regulator 110 may be smaller than in unbalanced power production. The terms "balance of power production" and "distribution of power production" may describe the level of the regulator operational characteristics of one or more of power regulators 110. The regulator operational characteristics of all power regulators 110 may be within a specified range of values. In unbalanced power production, the regulator operational characteristics of one or more of power regulators 110 might not be within the specified range of values. As mentioned above, under conditions of unbalanced power production between power regulators 110, the probability of damage to power regulators 110 or power sources 108 may increase relative to the conditions of balanced power production between power regulators 110.

Figure 2:
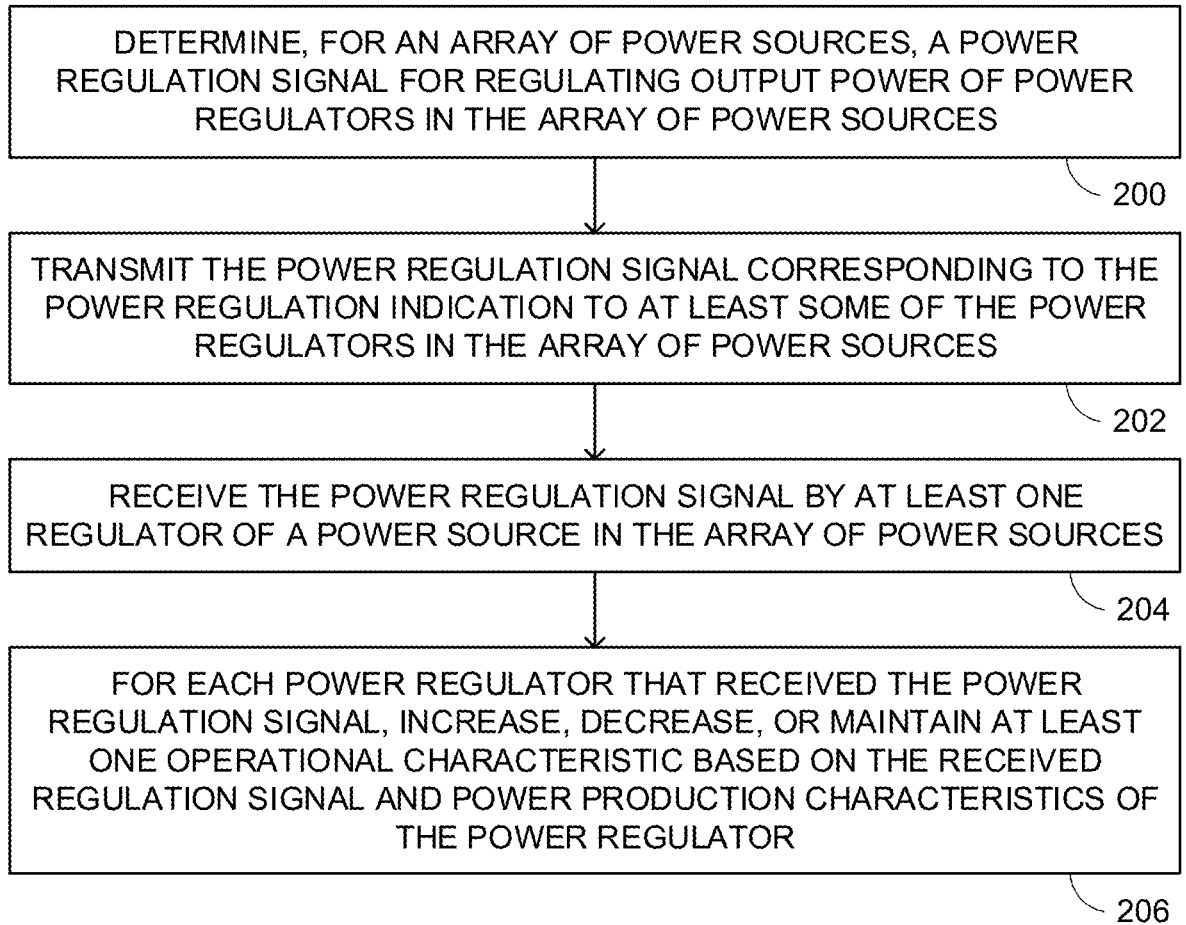
FIG. 2 illustrates an example method for regulating power and regulating power harvesting in an array of power sources, in accordance with aspects of the disclosure herein.

Reference is now made to FIG. 2, which illustrates an example method for regulating power harvesting in an array of power sources. In step 200, a power regulation signal for regulating output power between power regulators 110 in array of power sources 102 may be determined for array of power sources 102. The power regulation signal may correspond to a power regulation indication (e.g., required output power, required operation temperature, power increase indication, power decrease indication, and the like as further elaborated herein). As mentioned above and as further described below, the power regulation indication may be an expected regulator output, an increase indication, a decrease indication, a no-change indication, or any combination thereof. The power regulation indication may relate to the regulator operational characteristic (e.g., regulator output voltage, regulator output current, regulator output power, regulator operating temperature, duty cycle of the DC-DC converter), or the like. With reference to FIGS. 1A and 1C, a power regulation indication may be determined for power regulators 110 in array of power sources 102 by central module 101. The power regulation indication may relate to all power regulators 110, or to one or more of strings 106. The power regulation indication may be determined by central controller 112 based on the determined operational characteristics of power system 100.

In step 202, the power regulation signal corresponding to the power regulation indication may be transmitted to at least some of power regulators 110 in array of power sources 102. The power regulation indication may be common to all power regulators 110, and the signal may be broadcast to all power regulators 110 in array of power sources 102. The regulation indication may be transmitted only to some of power regulators 110 as a multicast signal. The regulation indication may be transmitted to one power regulator 110 as a unicast signal. With reference to FIGS. 1A and 1C, central communications module 114 may transmit the regulation signal to power regulators 110 in array of power sources 102. Central communications module 114 may transmit the regulation indication as a multicast signal to only some of power regulators 110 in array of power source 102 (e.g., to power regulators 110-21, 110-22, 110-23, . . . , 110-2M in string 106-2). Central communications module 114 may transmit the regulation indication as unicast signal to one of power regulators 110.

In step 204, the power regulation signal may be received by at least one power regulator 110 of power source 108 in array of power sources 102. With reference to FIG. 1C, regulator communications module 124 in power regulator 110 may receive the regulation signal relating to the power regulation indication.

In step 206, for each power regulator 110 that received the power regulation signal, at least one of the regulator operational characteristics may be increased, decreased, or maintained based on the received regulation signal and the power production characteristics of power regulator 110. With reference to FIG. 1C, regulator controller 120 may control (e.g., instruct, provide a command, etc.) power converter 122 to increase, decrease, or maintain the regulator operational characteristic (e.g., output voltage, output current, output power, operating temperature, converter duty cycle, or any combination thereof) of power regulator 110 based on a regulation signal received by regulator communications module 124.

Following are examples relating to power regulation between power regulators 110 in array of power sources 102, or in one of strings 106, according to various aspects of the present disclosure.

Figure 3B:
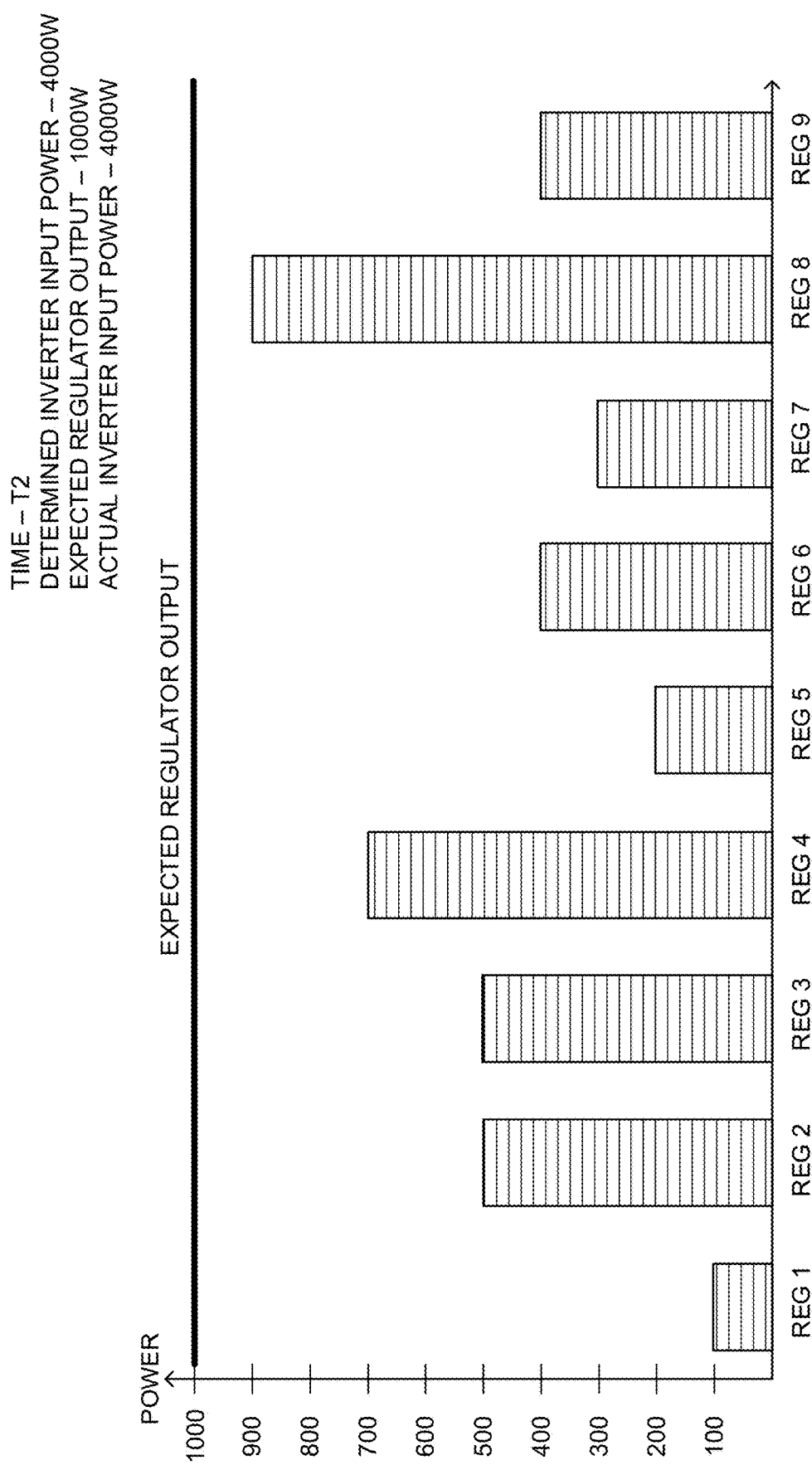

As mentioned above, one example of a power regulation indication may be an expected regulator output. The expected regulator output may relate to a value of one or more regulator operational characteristics of power regulators 110 (e.g., regulator output voltage, regulator output current, regulator output power, regulator operating temperature, duty cycle of the power converter, or the like). Reference is now made to FIGS. 3A, 3B, 3C, 3D, and 3E, which illustrate examples of power regulation in an array of power sources (e.g., array of power sources 102 as depicted in FIGS. 1A and 1B) where the power regulation indication may be an expected regulator output. As illustrated in FIGS. 3A-3E, array of power sources 102 may comprise nine power sources 108 (e.g., three strings of three power sources), wherein each power source 108 may be connected to a respective power regulator 110. FIGS. 3A-3E depict column diagrams of power, where each column represents the power of power regulator 110. The horizontally hatched section of a column represents produced power. The cross hatched section of a column represents potential power which is not produced by power regulator 110. As illustrated in FIGS. 3A-3E, the determined operational characteristic of central module 101 (e.g., determined inverter input power required for a load) may be 4000 Watts (4000 W) of power (e.g., array of power sources 102 may produce 4000 W of power since 4000 W of power is the demand from the application). FIG. 3A depicts an example of a state of power system 100 at time T1. At time T1, the determined inverter input power may be 4000 W of power, all power regulators 110 may operate at the MPP, and central controller 112 may determine an expected regulator output of 1000 W expected from each power regulator 110. Central communications module 114 may transmit a regulation signal relating to (e.g., indicating) the expected regulator output to power regulators 110 (e.g., to all power regulators as a broadcast signal). Each power regulator 110 may receive the regulation signal which indicates the expected regulator output, and may compare the actual (e.g., measured) regulator output to the received expected regulator output. Based on this comparison and the MPP associated with each power regulator 110, each power regulator 110 may increase, decrease, or maintain the regulator output (e.g., each power regulator 110 may output the minimum amount of power between the received expected regulator output, and the MPP associated with power regulator 110). In FIG. 3A (e.g., at time T1), central module 101 may receive only 3000 W of power (e.g., the actual inverter input power may be 3000 W of power).

FIG. 3B depicts an example of a state of power system 100 at time T2. At time T2, the determined inverter input power may still be 4000 W of power and all power regulators 110 may operate at the MPP. In FIG. 3B, the MPP of REG 2 may increase to 500 W, the MPP of REG 4 may increase to 700 W, and the MPP of REG 8 may increase to 900 W. In FIG. 3B (e.g., at time T2), central module 101 may receive 4000 W of power (e.g., the actual inverter input power may be 4000 W of power). Central controller 112 may still determine an expected regulator output of 1000 W expected from each power regulator 110. Central communications module 114 may transmit a regulation signal relating to (e.g., indicating) the expected regulator output to power regulators 110. Each power regulator 110 may receive the regulation signal and may compare the actual (e.g., measured) regulator output to the received expected regulator output. Based on this comparison and the MPP associated with each power regulator 110, each power regulator 110 may increase, decrease, or maintain the regulator output.

Figure 3C:
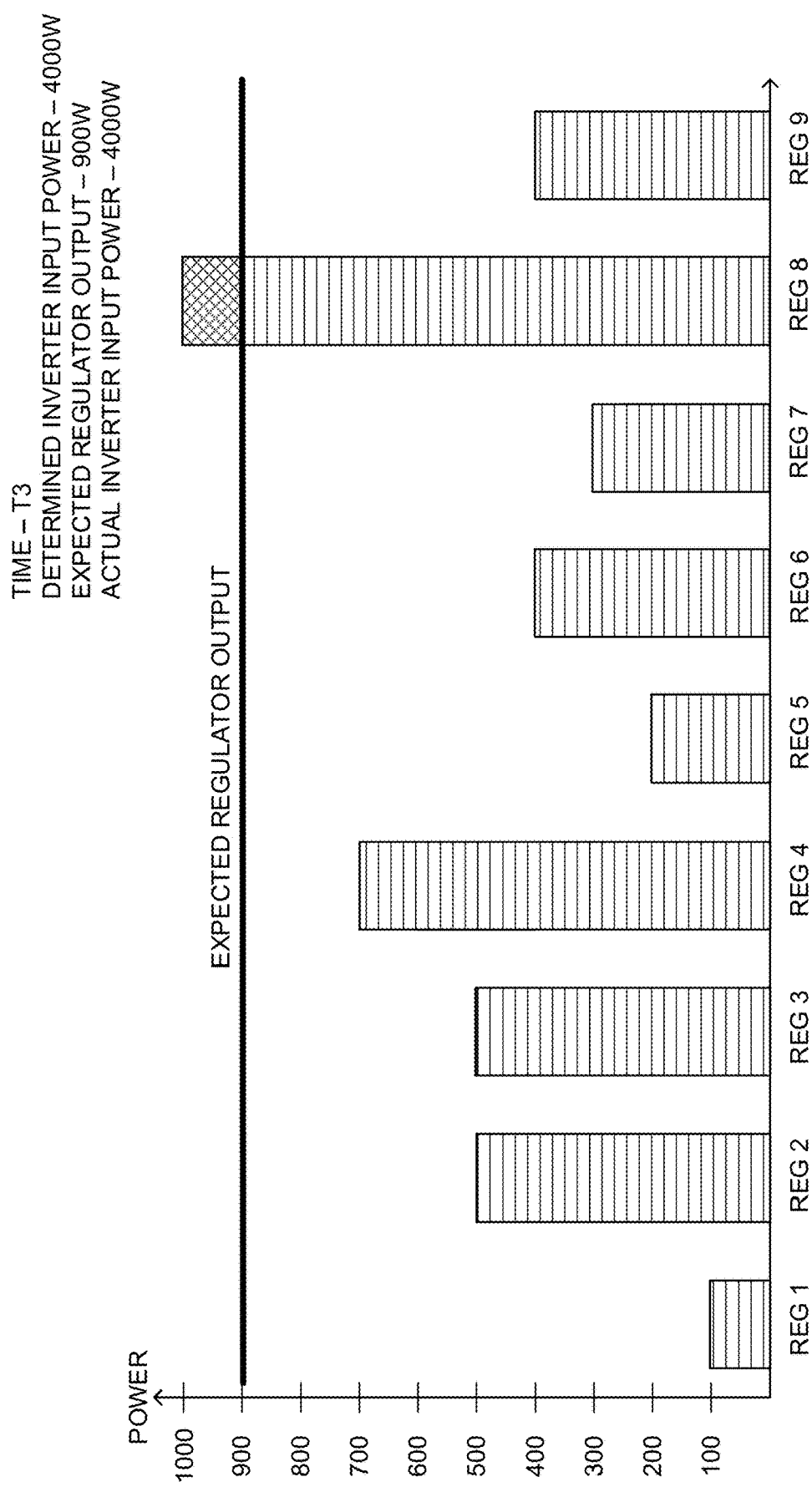

FIG. 3C depicts an example of a state of power system 100 at time T3. At time T3, the determined inverter input power may still be 4000 W of power. In FIG. 3C, the MPP of REG 8 may increase to 1000 W. If central module 101 does not adjust the expected regulator output of the power regulators 110 at time T3 from 1000 W, the input power to central module 101 may be 4100 W. As such, central controller 112 may determine an expected regulator output of 900 W from each power regulator 110. Central communications module 114 may transmit a regulation signal relating to (e.g., indicating) the expected regulator output to power regulators 110. Each power regulator 110 may receive the regulation signal which may indicate the expected regulator output, and may compare the actual (e.g., measured) regulator output to the received expected regulator output. Based on this comparison and the MPP associated with each power regulator 110, each power regulator 110 may increase, decrease, or maintain its regulator output. As illustrated in FIG. 3C, REG 8 may reduce the output power from 1000 W to 900 W. The crossed hatched area in the column associated with REG 8 may indicate the excess power which REG 8 might not produce.

Figure 3D:
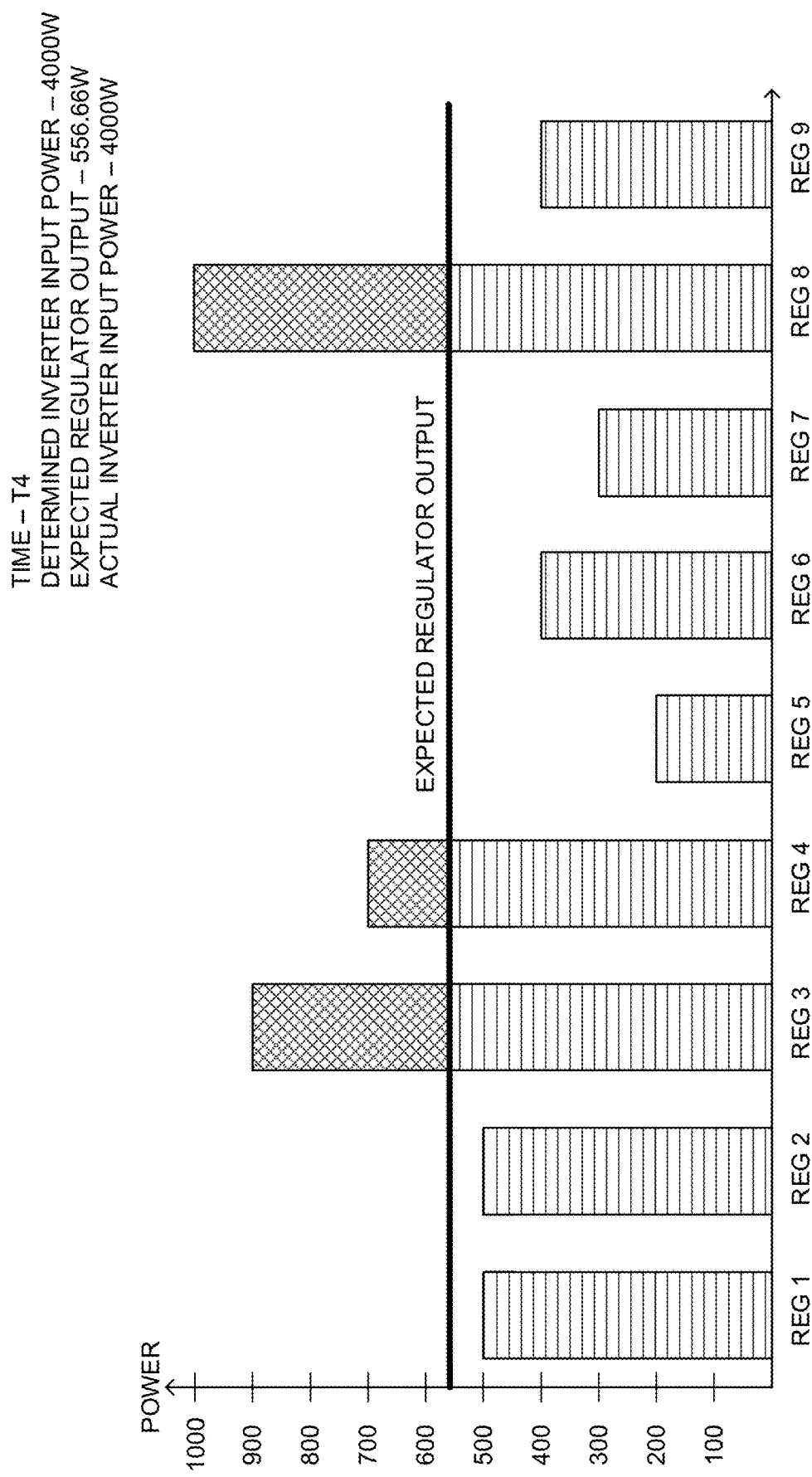

FIG. 3D depicts an example of a state of power system 100 at time T4. At time T4, the determined inverter input power may still be 4000 W of power. In FIG. 3D (e.g., at time T4), the MPP of REG 1 may increase to 500 W and the MPP of REG 3 may increase to 900 W. If central module 101 does not adjust the expected regulator output, the input power to central module 101 may be 4900 W. As such, central controller 112 may determine an expected regulator output of 556.66 W from each power regulator 110. Central communications module 114 may transmit a regulation signal relating to (e.g., indicating) the expected regulator output to power regulators 110. Each power regulator 110 may receive the regulation signal which may indicate the expected regulator output, and may compare the actual (e.g., measured) regulator output to the received expected regulator output. Based on this comparison and the MPP associated with each power regulator 110, each power regulator 110 may increase, decrease, or maintain the regulator output. As illustrated in FIG. 3D, REG 4, and REG 8 may reduce the regulator output to 556.66 W. REG 3 may increase the regulator output to 566.66 W.

Figure 3E:
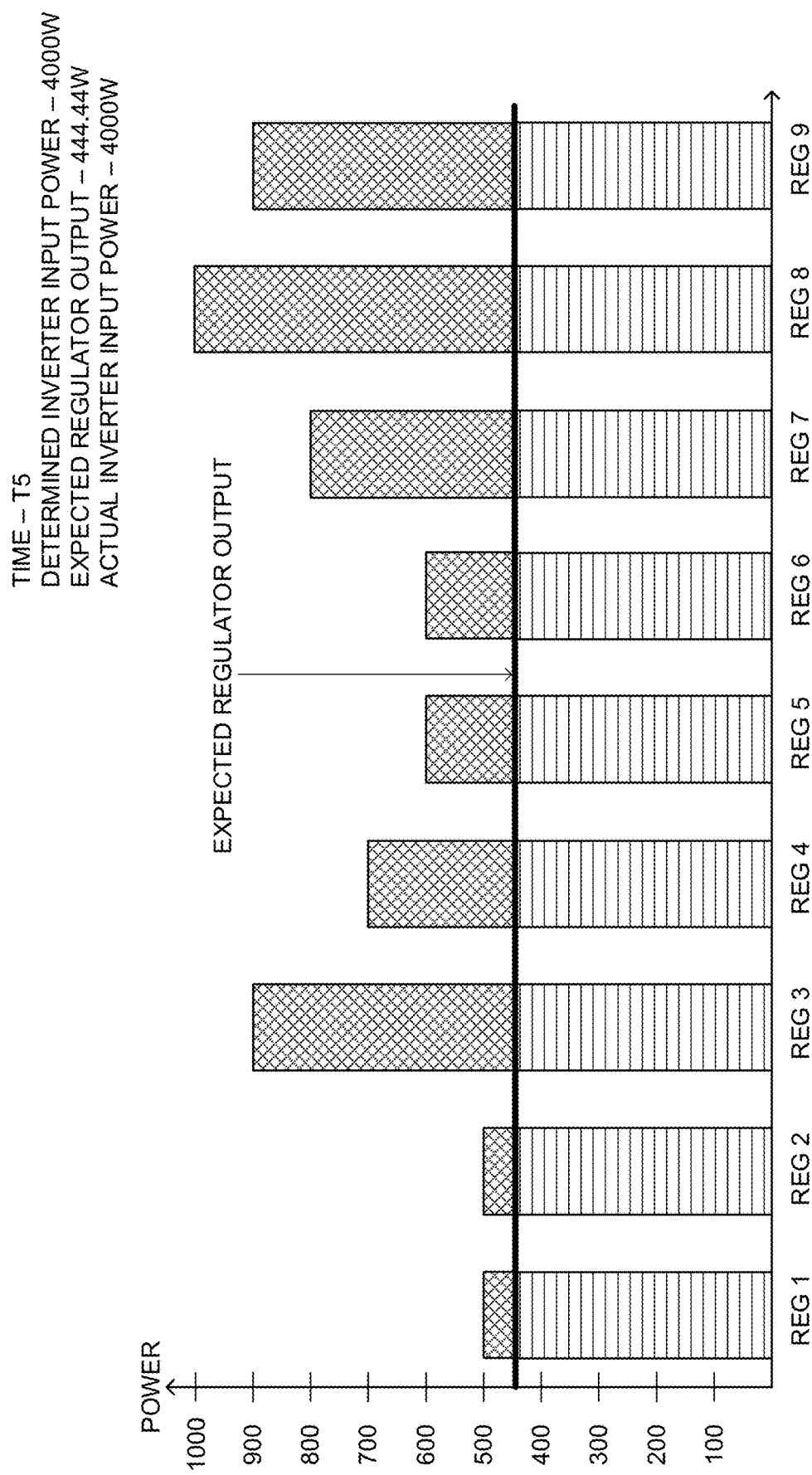

FIG. 3E depicts an example of a state of power system 100 at time T5. At time T5, the determined inverter input power may still be 4000 W of power. In FIG. 3E (e.g., at time T5), the MPP of REG 5 and REG 6 may increase to 600 W, the MPP of REG 7 may increase to 800 W, and the MPP of REG 9 may increase to 900 W. If central module 101 does not adjust the expected regulator output from the 556.66 W at time T4, then the total input power to central module 101 may be 6500 W. As such, central controller 112 may determine an expected regulator output of 444.44 W from each power regulator 110. Central communications module 114 may transmit a regulation signal relating to (e.g., indicating) the expected regulator output to power regulators 110. Each power regulator 110 may receive the regulation signal which may indicate the expected regulator output, and may compare the actual (e.g., measured) regulator output to the received expected regulator output. Based on this comparison and the MPP associated with each power regulator 110, each power regulator 110 may increase, decrease, or maintain the regulator output. As illustrated in FIG. 3E, REG 1, REG 2, REG 3, REG 4, and REG 8 may reduce the output power to 444.44 W. REG 5, REG 6, REG 7, and REG 9 may increase the output power to 444.44 W.

Figure 4A:
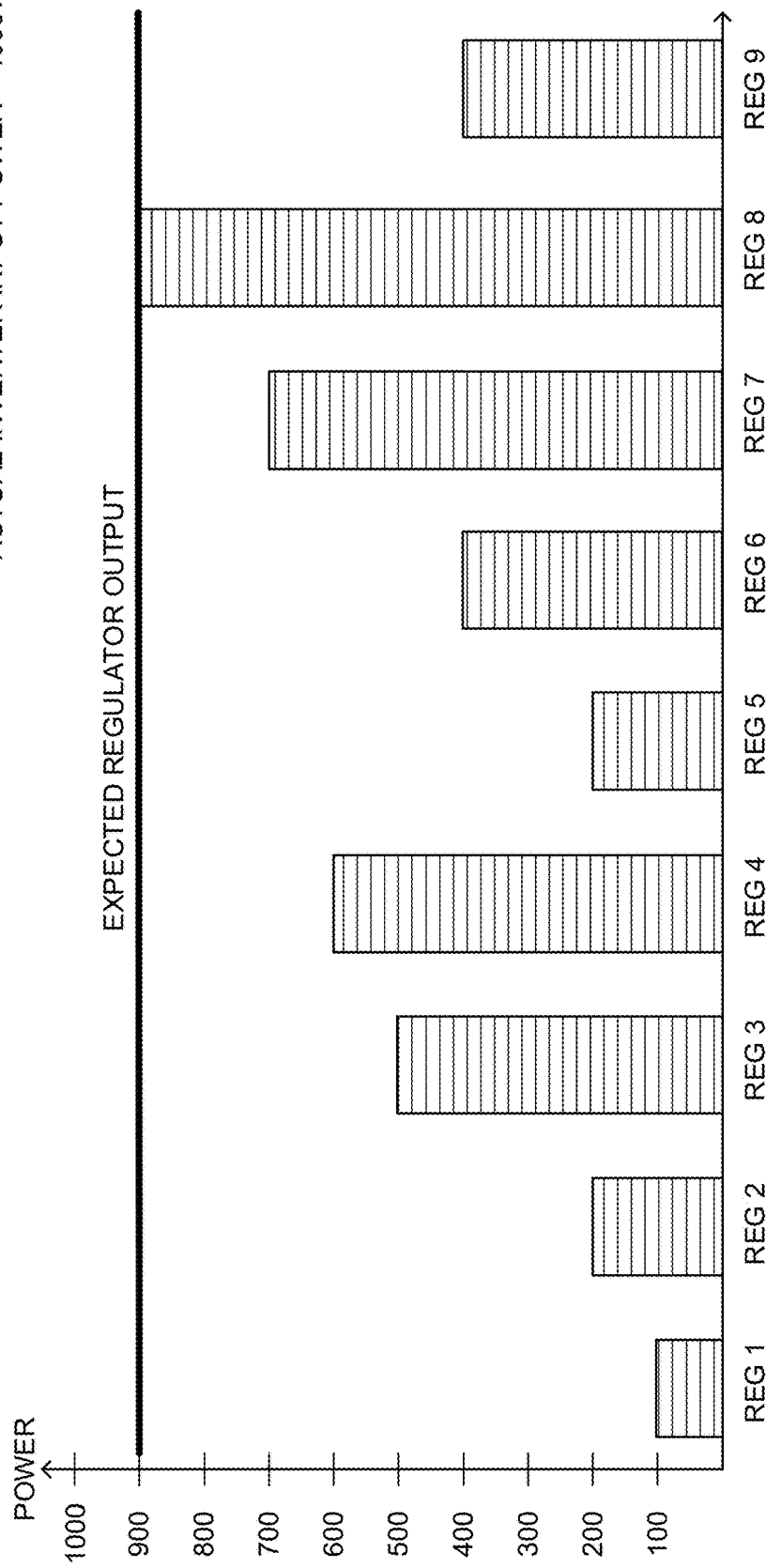
FIGS. 4A-4D illustrate example graphical representations of power regulation in an array of power sources, in accordance with aspects of the disclosure herein.

Reference is now made to FIGS. 4A, 4B, 4C, and 4D, which illustrate power regulation in array of power sources 102 (e.g., as depicted in FIGS. 1A and 1B) where the power regulation indication may be an expected regulator output. As illustrated in FIGS. 4A-4D, array of power sources 102 may comprise nine power sources 108 (e.g., three strings of three power sources), each connected to a respective power regulator 110. FIGS. 4A-4D depict column diagrams of power, where each column represents the power associated with each power regulator. Horizontally hatched sections of a column represent produced power. Cross hatched sections of a column represent potential power that might not be produced by a regulator. FIG. 4A depicts an example of a state of power system 100 at time T6. At time T6, the determined inverter input power may be 4000 W of power, all power regulators 110 may operate at the MPP, and central controller 112 may determine an expected regulator output of 900 W from each power regulator 110. Central communications module 114 may transmit a regulation signal relating to (e.g., indicating) the expected regulator output to power regulators 110 (e.g., to all power regulators as a broadcast signal). Each power regulator 110 may receive the regulation signal which may indicate the expected regulator output, and may compare the actual (e.g., measured) regulator output to the received expected regulator output. Based on this comparison and the MPP associated with each power regulator 110, each power regulator 110 may increase, decrease, or maintain the regulator output (e.g., each power regulator outputs the minimum between the received expected regulator output and the MPP associated with the power regulator).

Figure 4B:
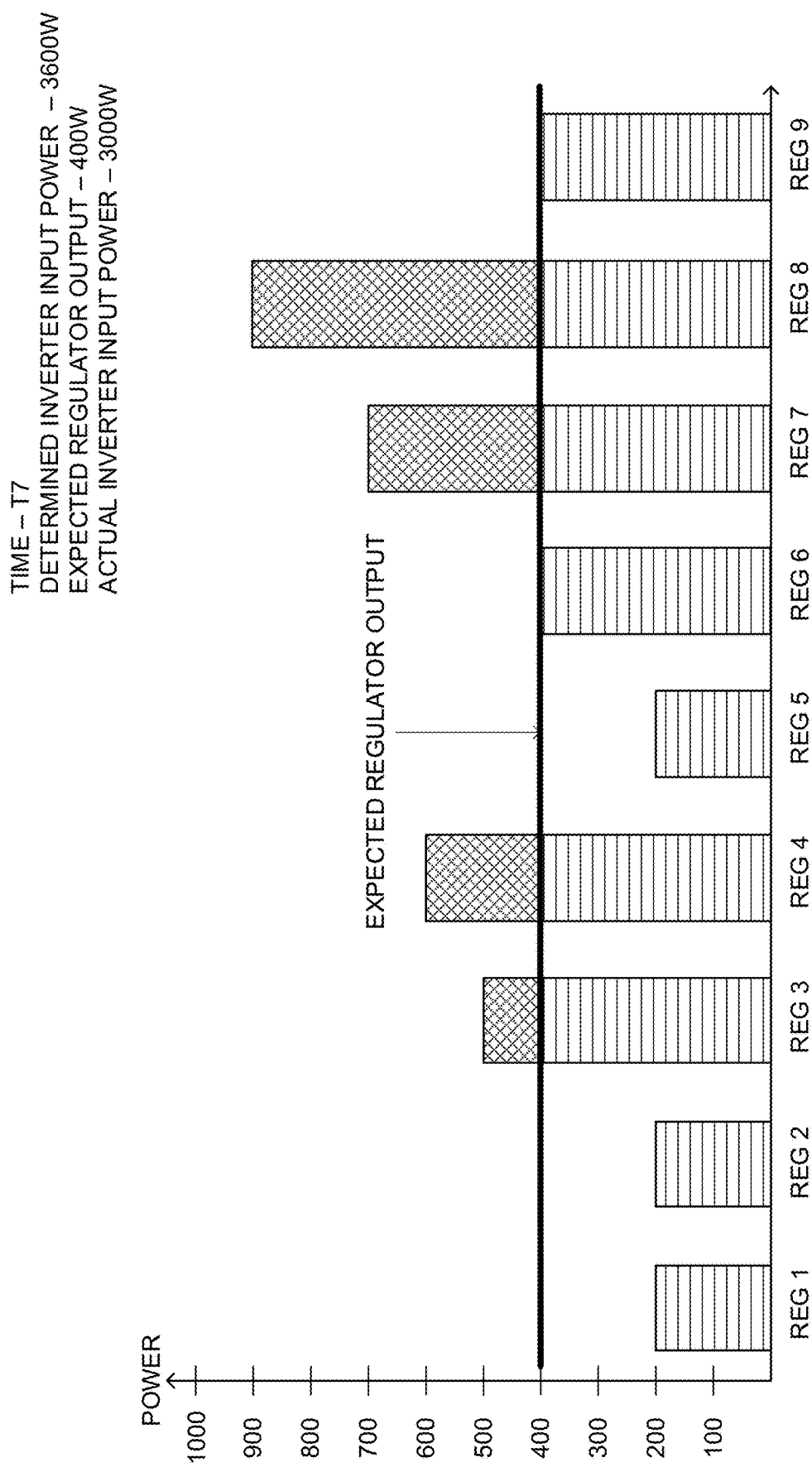

FIG. 4B depicts an example of a state of power system 100 at time T7. At time T7, the MPP and the output power of REG 1 may increase to 200 W. At time T7, central module 101 may reduce the determined inverter input power to 3600 W. Central controller 112 may determine an expected regulator output of 400 W from each power regulator 110 (e.g., where central module 101 may have information relating to the number of regulators in array of power sources 102). Central communications module 114 may transmit a regulation signal relating to (e.g., indicating) the expected regulator output to power regulators 110. Each power regulator 110 may receive the regulation signal which may indicate the expected regulator output, and may compare the actual (e.g., measured) regulator output to the received expected regulator output. Based on this comparison and the MPP associated with each power regulator 110, each power regulator 110 may increase, decrease, or maintain the power regulator output. As illustrated in FIG. 4B, REG 1 may increase the output power to 200 W (e.g., the MPP). REG 3, REG 4, REG 7, and REG 8 may each reduce the output power to 400 W. However, central module 101 may still receive only 3000 W at the input (e.g., the actual inverter input power may be 3000 W of power).

Figure 4C:
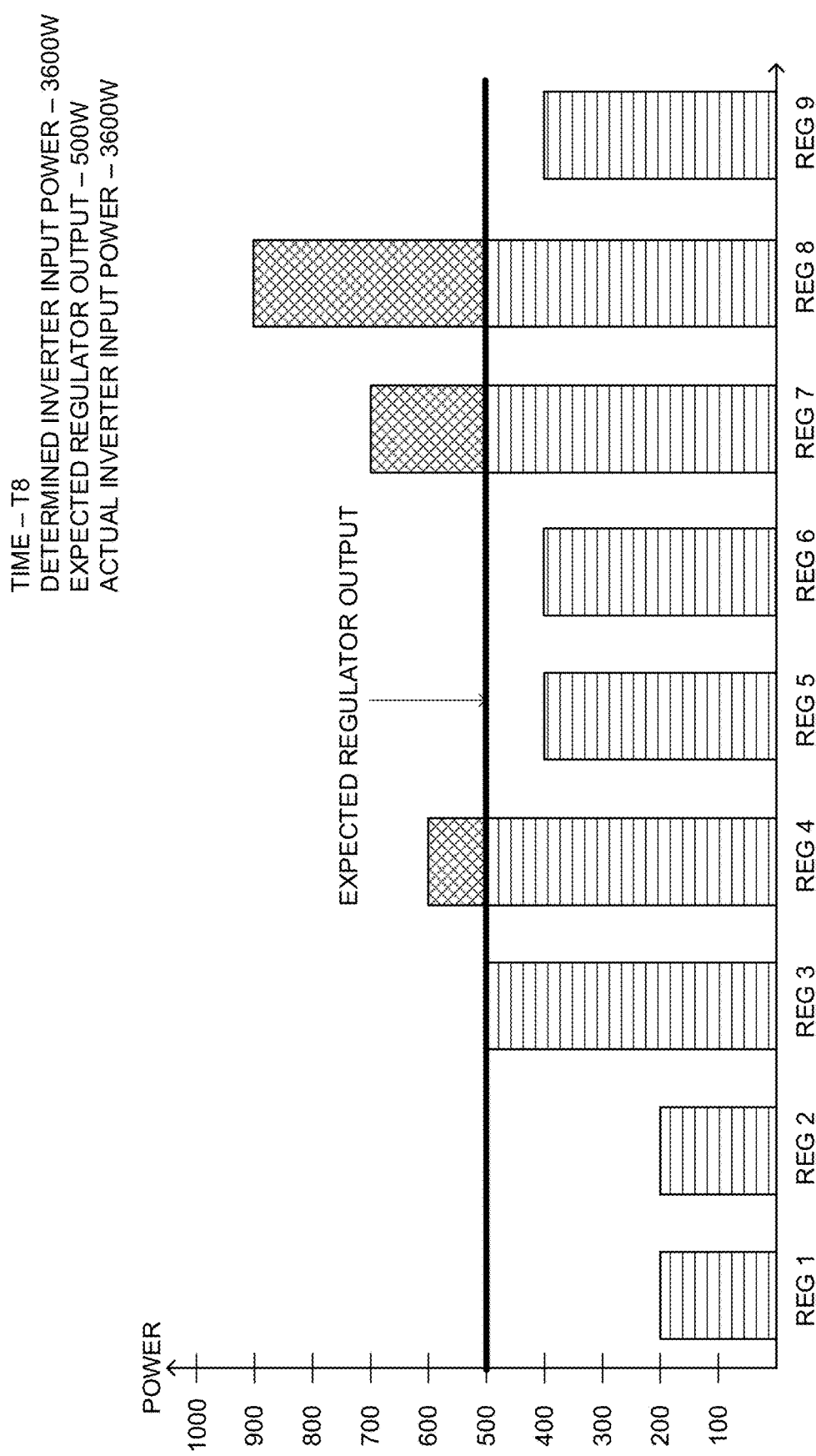

FIG. 4C depicts an example of a state of power system 100 at time T8. At time T8, the determined inverter input power may still be 3600 W of power. In FIG. 4C, the MPP of REG 5 may increase to 400 W and REG 5 may increase the output power to 400 W. If central module 101 does not adjust the expected regulator output at time T8 from 400 W, then the input power to central module 101 may be 3200 W. As such, central controller 112 may determine an expected regulator output of 500 W from each power regulator 110. Central communications module 114 may transmit a regulation signal relating to (e.g., indicating) the expected regulator output to power regulators 110. Each power regulator 110 may receive the regulation signal which may indicate the expected regulator output, and may compare the actual (e.g., measured) regulator output characteristic to the received expected regulator output. Based on this comparison and the MPP associated with each power regulator 110, each power regulator 110 may increase, decrease, or maintain the power regulator output. As illustrated in FIG. 4C, REG 5 may increase the output power to 400 W. REG 3, REG 4, REG 7, and REG 8 may each increase the output power to 500 W, and central module 101 may receive 3600 W at the input (e.g., the actual inverter input power may be 3000 W of power).

Figure 4D:
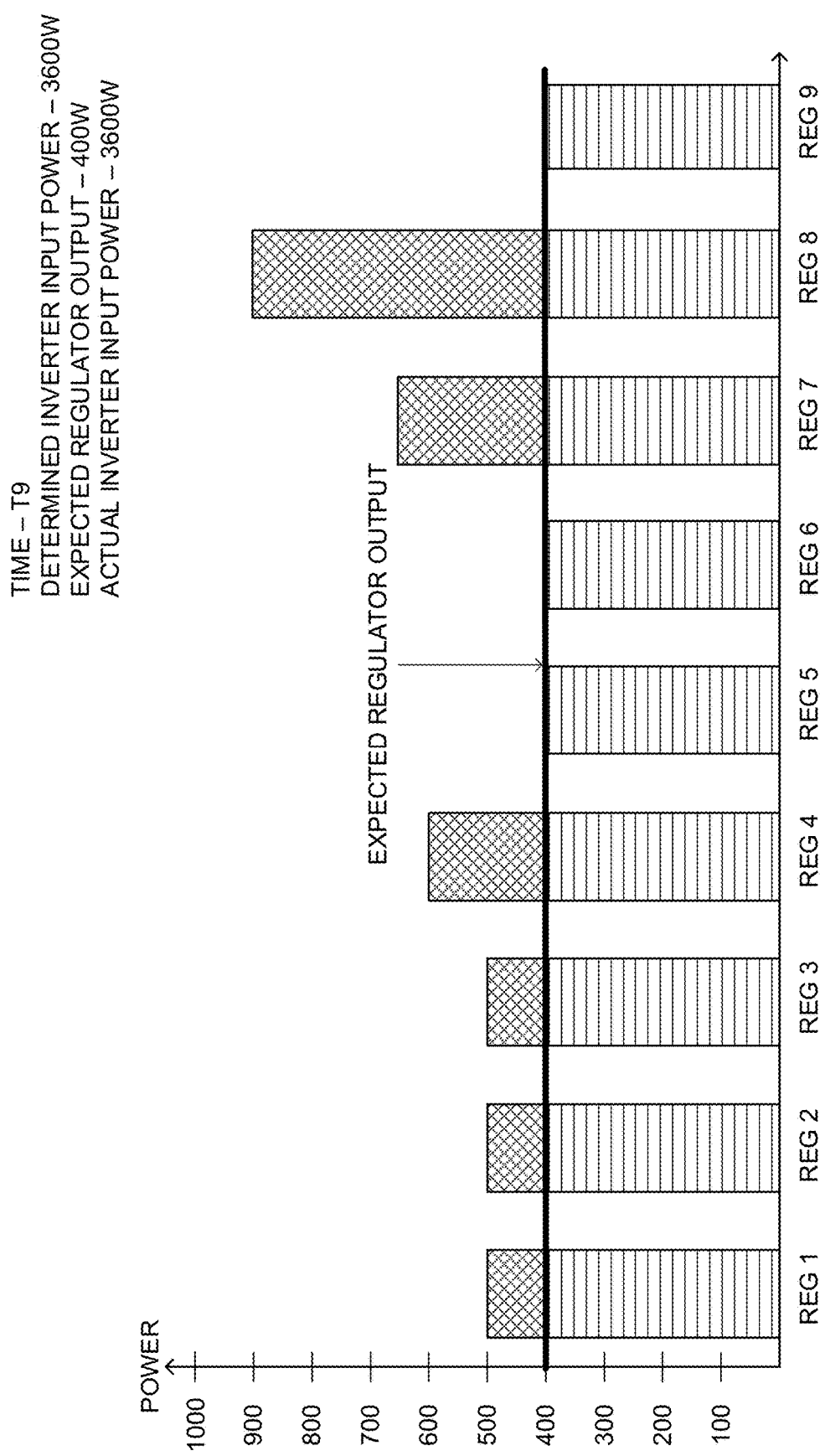

FIG. 4D depicts an example of a state of power system 100 at time T9. At time T9, the determined inverter input power may still be 3600 W of power. In FIG. 4D (e.g., at time T9), the MPP of REG 1 and REG 2 may increase to 500 W. If central module 101 does not adjust the expected regulator output from the 500 W at time T9, then the input power to central module 101 may be 4200 W. As such, central controller 112 may determine an expected regulator output of 400 W from each power regulator 110. Central communications module 114 may transmit a regulation signal relating to (e.g., indicating) the expected regulator output to power regulators 110. Each power regulator 110 may receive the regulation signal which may indicate the expected regulator output, and may compare the actual (e.g., measured) regulator output to the received expected regulator output. Based on this comparison and the MPP associated with each power regulator 110, each power regulator 110 may increase, decrease, or maintain the regulator output. As illustrated in FIG. 4D, REG 1 and REG 2 may each decrease the output to 400 W. As further illustrated in FIG. 4D, REG 3, REG 4, REG 7, and REG 8 may each decrease the output power to 400 W, and central module 101 may receive 3600 W at the input (e.g., the actual inverter input power may be 3600 W of power).

In the examples described above in conjunction with FIGS. 3A-3E and 4A-4D, central module 101 may iteratively set the expected regulator output until the determined inverter input power and the actual (e.g., measured) inverter input power match. To do so, central module 101 may implement a search algorithm (e.g., linear search, binary search). For example, referring to FIGS. 3B and 3C, central controller 112 may iteratively reduce the expected regulator output from 1000 W to 900 W. With reference to FIGS. 4B and 4C, central controller 112 may iteratively increase the expected regulator output from 400 W to 500 W.

The examples described in conjunction with FIGS. 3A to 3E, and 4A to 4D may describe power regulators connected in a series string. In a series string, the current may be the same for all power regulators. As such, the expected regulator output may relate to the regulator output voltage. Balancing power production may relate to balancing power production between strings 106. Balancing power production between strings 106 may relate to balancing the currents produced by strings 106. As such, the expected regulator output may relate to the output current of the power regulators in the string.

The description above described the use of expected regulator outputs, wherein an expected regulator output may relate to output power of power regulators 110. As mentioned above, the expected regulator output may correspond to output voltage, output current, operating temperature, duty cycle, or output frequency (e.g., if the power regulator includes a DC-AC converter as shown in FIG. 14) of power regulators 110, or to any combination thereof. When the expected regulator output is the voltage of power regulator 110, the expected regulator output may be determined based on the voltage determined by central module 101 (e.g., the voltage that the application may demand) and the number of power regulators 110 in string 106. When the expected regulator output of power regulator 110 is current, the expected regulator output may be determined based on the current determined by central module 101 (e.g., the current that the application may demand) and the number of strings 106. Thus, central controller 112 may determine the expected regulator output of power regulators 110 based on the determined operational characteristics of power system 100 and further based on a regulation number (e.g., the number of power regulators 110 in array of power sources 102, the number of power regulators 110 in a string 106, the number of strings 106 in array of power sources 102).

Figure 5:
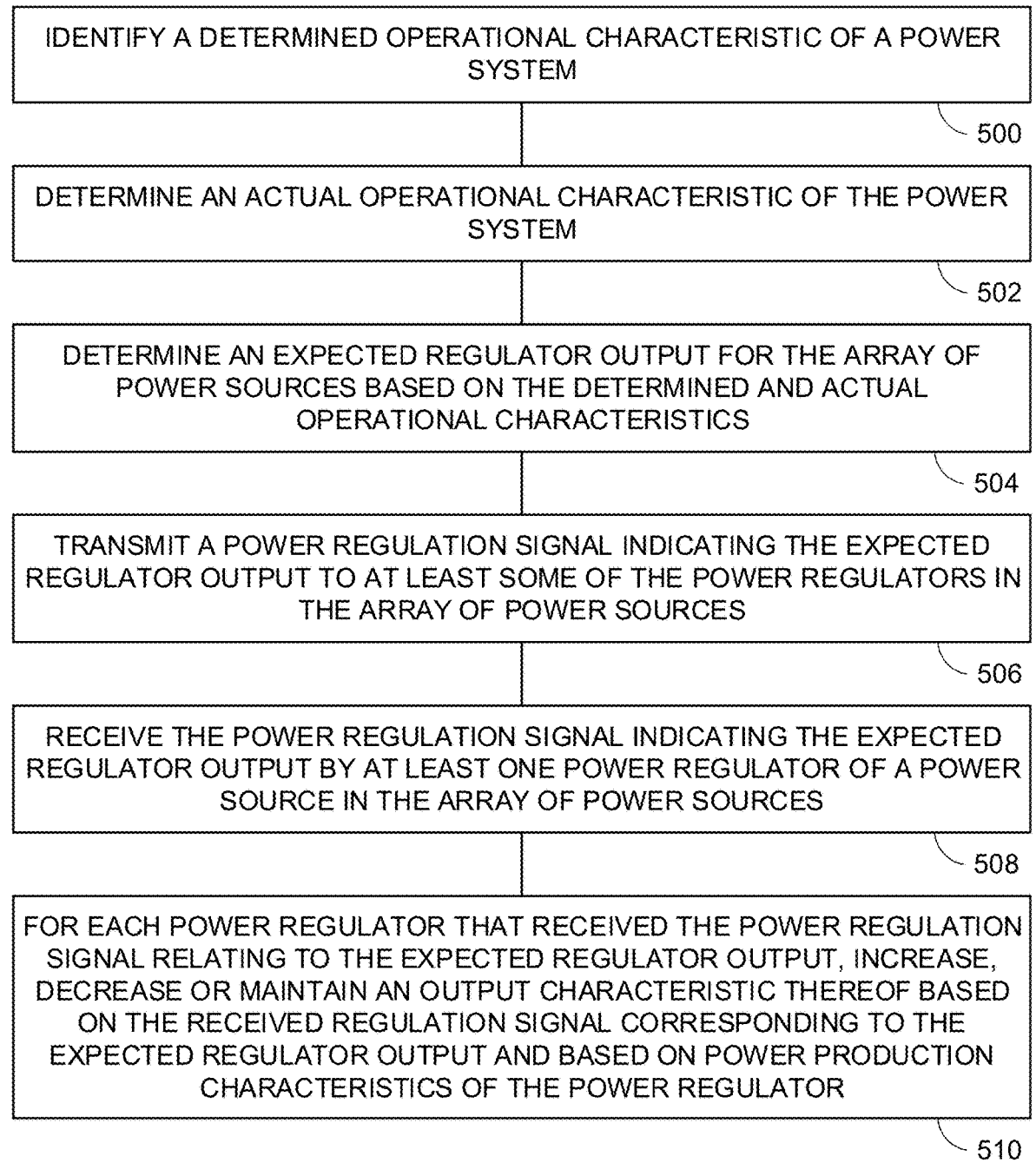
FIG. 5 illustrates an example method for power regulation in an array of power sources, in accordance with aspects of the disclosure herein.
Figure 6A:
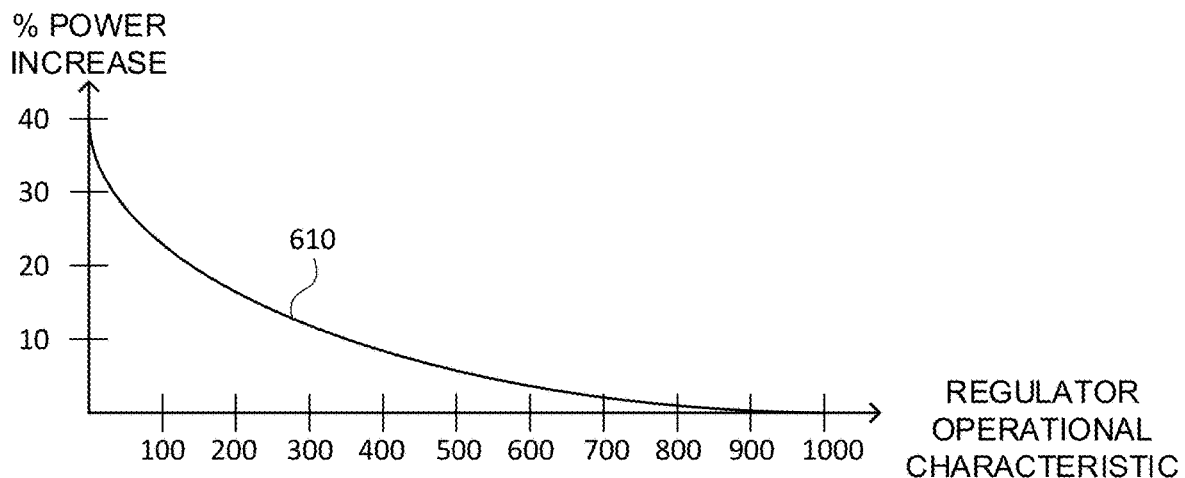
FIGS. 6A and 6B illustrate example graphical representations of changes in power production versus changes in regulator operational characteristics, in accordance with aspects of the disclosure herein.
Figure 6B:
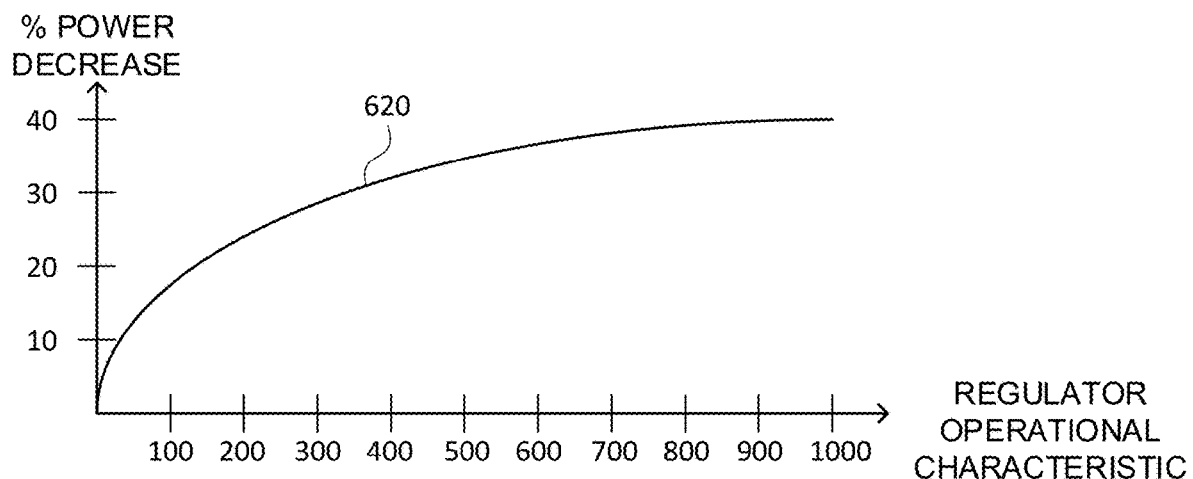
Figure 6C:
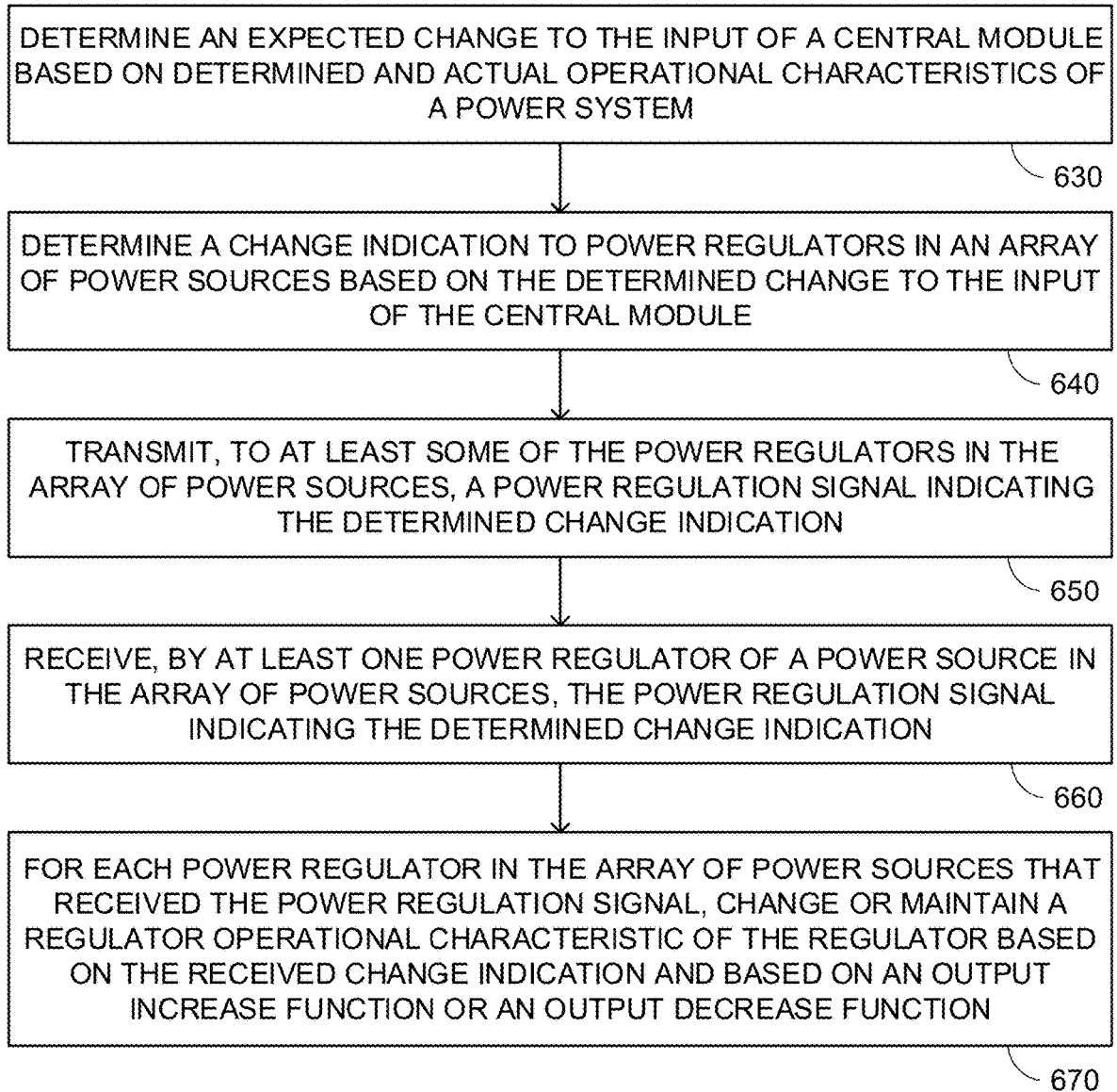
FIG. 6C illustrates an example method for regulating power production in an array of power sources based on determined and actual operational characteristics of a photovoltaic power system, in accordance with aspects of the disclosure herein.

Reference is now made to FIG. 5. FIG. 5 depicts a method for regulating power in an array of power sources (e.g., array of power sources 102) based on expected regulator output. The method in FIG. 5 relates to employing an expected regulator output for regulating the power in array of power sources 102, as described above in conjunction with FIGS. 3A-3E and 4A-4D. In step 500, a determined operational characteristic of a power system may be identified. The determined operational characteristic of a power system may be pre-defined or may be defined by a determined output power, output voltage, or output current (e.g., of an array of power sources, or of a central module such as an inverter or a combiner). With reference to FIG. 1A or 1B, central controller 112 of central module 101 may identify a determined operational characteristic (e.g., of array of power sources 102).

In step 502, an actual (e.g., measured) operational characteristic of the power system may be determined. With reference to FIG. 1A or 1B, central controller 112 may determine an actual (e.g., measured) operational characteristic of the power system (e.g., based on measurements from sensor(s) 116).

In step 504, an expected regulator output may be determined for the array of power sources. The expected regulator output may be determined based on the determined operational characteristics compared to the actual (e.g., measured) operational characteristic. The expected regulator output may further be determined based on a regulation number. The regulation number may be the number of power sources in the array of power sources (e.g., if regulator power is the expected regulator output), the number of power sources in a string (e.g., if regulator voltage is employed), or the number of strings (e.g., if regulator current is employed). With reference to FIG. 1A or 1B, central controller 112 may determine an expected regulator output based on one or more of the determined operational characteristics of power system 100. As mentioned above, the determined operational characteristics of power system 100 may comprise at least one of output voltage, output current, or output power of array of power sources 102.

In step 506, a power regulation signal relating to (e.g., indicating) the expected regulator output may be transmitted to at least some of the power regulators in the array of power sources. In some examples, the expected regulator output may be common to all power regulators 110, and the signal may be broadcasted to all power regulators 110 in the array of power sources 102. With reference to FIG. 1A or 1B, central communications module 114 in central module 101 may transmit, to power regulators 110 in array of power sources 102, a broadcast regulating signal relating to (e.g., indicating) the expected regulator output. In some examples, the expected regulator output may be common to all power regulators 110 in string 106 of power regulators 110, and the signal may be multicast to power regulators 110 in that string. With reference to FIG. 1A or 1B, central communications module 114 of central module 101 may transmit to power regulators 110 (e.g., power regulators 110-21, 110-22, 110-23, . . . 110-2N in string 106-2), a multicast regulating signal relating to (e.g., indicating) the expected regulator output.

In step 508, the power regulation signal relating to (e.g., indicating) the expected regulator output may be received by at least one power regulator 110 of power source 108 in array of power sources 102. With reference to FIG. 1C, regulator communications module 124 in power regulator 110 may receive the signal relating to (e.g., indicating) the expected regulator output.

In step 510, for each power regulator that receives the power regulation signal relating to (e.g., indicating) the expected regulator output, a regulator operational characteristic may be increased, decreased, or maintained based on the received regulation signal and based on one or more power production characteristics of the power regulator. For example, the expected regulator output may relate to output power, the regulator operational characteristic may be regulator output power, and the power production characteristic may be the MPP of respective power regulator 110 (e.g., of the respective power source of the power regulator). In such an example, power regulator 110 may output the minimum between the received expected regulator output and the MPP. With reference to FIG. 1C, regulator controller 120 may increase, decrease, or maintain the output power of a respective power regulator 110 based on at least one of the received regulation signal corresponding to the expected regulator output, based on the output power of power regulator 110, or based on the MPP of the respective power source 108. Regulator controller 120 may increase, decrease, or maintain the output power of a respective power regulator 110 based on the received regulation signal relating to (e.g., indicating) the expected regulator output, based on the output power of power regulator 110, or the operating temperature of power regulator 110 (e.g., regulator controller 120 may direct power converter 122 to increase output power if the temperature of power regulator 110 is above a determined level).

The power regulation indication may be a change indication. A change indication may be an increase indication, a decrease indication, a no-change indication, or any combination thereof. Based on receiving an increase indication or a decrease indication, each power regulator 110 may use an output increase function or an output decrease function (e.g., stored therein) to increase or decrease a regulator operational characteristic accordingly. Reference is now made to FIGS. 6A, 6B and 6C, which illustrate an example of power regulation in an array of power sources, where the power regulation indication for power regulators 110 (e.g., in one of strings 106 or in array of power sources 102) may be a change indication. FIG. 6A illustrates an example of an output increase function 610. Output increase function 610 in FIG. 6A may be a non-linear decreasing function of percentage of power increase versus regulator operational characteristic of power regulator 110. The regulator operational characteristic may be output power, output voltage, output current, operating temperature, converter duty cycle, output frequency (e.g., if power regulator 110 is a microinverter), switching frequency, or a figure of merit incorporating some or all of the above mentioned regulator operational characteristics. Such a figure of merit may be a weighted average of normalized values of some or all of the above-mentioned characteristics. A controller (e.g., regulator controller 120 of FIG. 1C) may control one or more regulator operational characteristics of power regulator 110, based on receiving an increase indication. In the example of FIG. 6A, output increase function 610 may be a decreasing function of percentage of output voltage increase versus regulator operational characteristic or percentage of output current increase versus regulator operational characteristic. Output increase function 610 may be a constant, a linear function, a polynomial, or an exponential or a logarithmic decreasing function. Output increase function 610 may be implemented as a Look Up Table (LUT), as a vector of parameters, or a combination thereof. Since output increase function 610 may be a decreasing function of a regulator operational characteristic, a higher regulator operational characteristic may correspond to a lower percentage of power increase.

In the following example, increase function 610 may be a function of percentage of power increase versus regulator output power. The output power of a first power regulator (e.g., power regulator 110-11, as illustrated in FIG. 1A), may be 500 W and the output power of a second power regulator (e.g., power regulator 110-12, as illustrated in FIG. 1A) may be 300 W, which may result in a difference of 200 W. Both power regulators may operate according to output increase function 610. Both power regulators may receive an increase indication. Based on output increase function 610, the first power regulator (e.g., power regulator 110-11) may increase the output power by 6% and the second power regulator (e.g., power regulator 110-12) may increase the output power thereof by 12%. Consequently, the first power regulator may output 530 W and the second power regulator may output 336 W, which may result in a difference of 194 W. Thus, the difference between the power produced by the first power regulator and the second power regulator may be reduced. The reduction of the difference may improve the balance of power production (e.g., the distribution of power). A power regulator 110 may increase the output power until the respective MPP is reached.

FIG. 6B illustrates an example of a decrease function 620 in accordance with aspects of the disclosure herein. In the example of FIG. 6B, output decrease function 620 may be a non-linear increase function of percentage of power decrease versus regulator operational characteristic of power regulator 110. A controller (e.g., regulator controller 120 of FIG. 1C) may control one or more regulator operational characteristics of power regulator 110 based on receiving a decrease indication. Output decrease function 620 may be an increasing function of percentage of voltage decrease versus regulator operational characteristic or percentage of current decrease versus regulator operational characteristic. Also, output decrease function 620 might not be a logarithmic function. Output decrease function 620 may be a constant, a linear function, a polynomial, or a logarithmically increasing function. Output decrease function 620 may be implemented as a Look Up Table (LUT), as a vector of parameters, or a combination thereof. Since output decrease function 620 may be an increasing function of a regulator operational characteristic, a higher regulator operational characteristic may correspond to a higher percentage of power decrease.

The increase function 610, decrease function 620, or both, may be change with the lifetime of power regulator 110. For example, increase function 610 may be scaled down as the lifetime of power regulator 110 increases. Thus, the percentage increase of the regulator operational characteristic may decrease as the lifetime of power regulator 110 increases. Similarly, decrease function 610 may be scaled up as the lifetime of power regulator 110 increases. Thus, the percentage decrease of the regulator operational characteristic may increase as the lifetime of power regulator 110 increases. Scaling the increase function 610, decrease function 620, or both based on the lifetime of power regulator 110 may increase the MTBF.

In the following example, output decrease function 620 may be a function of percentage of power decrease versus regulator output power. In FIG. 6B, the output power of a first power regulator may be 500 W and the output power of a second power regulator may be 300 W, which may result in a difference of 200 W. Both power regulators may operate according to output decrease function 620. Both power regulators may receive a decrease indication. Based on output decrease function 620, the first power regulator may decrease the output power by 35% and the second power regulator may decrease the output power by 28%. Consequently, the first power regulator may output 370.37 W and the second power regulator may output 234.37 W, which may result in a difference of 136 W. Thus, the difference between the power produced by the first power regulator and the second power regulator may be reduced. The reduction of the difference may improve the balance of power production (e.g., the distribution of power).

It should be appreciated that the output increase function and the output decrease function might not be the same type of function. For example, the output increase function may be a constant function and the output decrease function may a polynomial. Furthermore, output increase function 610 and output decrease function 620 may be a percentage of power increase versus a regulator operational characteristic. The output increase function and the output decrease function may relate to absolute or relative values of regulator operational characteristics, and may also be a multi-dimensional function of a regulator operational characteristic as a function of two or more regulator operational characteristics. For example, the output increase function may relate to increase of output voltage as a function of output power and operating temperature. As a further example, the output decrease function may relate to decrease of output voltage as a function of output current and operating temperature. The examples described above are present solely for illustration purposes and should not be considered limiting. For example, instead of percentage increase or percentage decrease, the increase function or decrease function of a power regulator 110 may specify an increase factor or a decrease factor as a function of regulator operational characteristics.

According to aspects of the disclosure herein, central module 101 may transmit one of an increase indication or a decrease indication. Central module 101 may transmit an increase indication (e.g., periodically, based on determined input power compared to actual (e.g., measured) input power, based on determined input voltage compared to actual (e.g., measured) input voltage, based on determined input current compared to actual (e.g., measured) input current). Power regulator 110 may increase the regulator operational characteristic according to the output increase function (e.g., output increase function 610). Between receptions of increase indications, power regulators 110 may decrease the regulator operational characteristic according to the output decrease function (e.g., output decrease function 620). According to aspects of the disclosure herein, central module may transmit a decrease indication. Power regulator 110 may decrease the regulator operational characteristic according to the output decrease function (e.g., output increase function 402). Between receptions of decrease indications, power regulators 110 may increase the regulator operational characteristic according to the output increase function (e.g., output increase function 400).

FIG. 6C depicts a method for regulating power in an array of power sources, such as array of power sources 102, based on at least one of an output increase indication, an output decrease indication, or a no-change indication, as described above in conjunction with FIGS. 6A and 6B. In step 630, a change to an input (e.g., input voltage, input current, input power) of central module 101 (e.g., increase, decrease, or no-change) may be determined based on the determined and actual (e.g., measured) operational characteristics of a power system. With reference to FIGS. 1A and 1B, central controller 112 may determine a change to an input of central module 101 (e.g., based on measurements from sensor(s) 116).

In step 640, a change indication may be determined for the power regulators in an array of power sources based on the determined change to the input of central module 101. This change indication may be an increase indication, a decrease indication, or a no-change indication of the determined regulator output characteristic (e.g., regulator output voltage, regulator output current, or regulator output power). With reference to FIGS. 1A and 1B, central controller 112 may determine a change indication for power regulators 110 in array of power sources 102 based on the determined change to the input of central module 101.

In step 650, a power regulation signal relating to (e.g., indicating) the determined change indication may be transmitted to at least some of power regulators 110 in array of power sources 102. The regulation signal may be a broadcast signal, a multicast signal, or a unicast signal. With reference to FIGS. 1A and 1B, central communications module 114 may transmit, to at least some of power regulators 110, a regulation signal relating to the change indication determined by central controller 112.

In step 660, the power regulation signal relating to (e.g., indicating) the determined change indication may be received by at least one power regulator 110, associated with a power source 108, of the plurality of the power regulators in array of power sources 102. With reference to FIG. 1C, regulator communications module 124 of at least one of power regulators 110 may receive the regulation signal relating to the determined change indication.

In step 670, each power regulator 110 in array of power sources 102 that received the power regulation signal may change or maintain the regulator operational characteristics based on the received change indication, and based on an output increase function or output decrease function. With reference to FIG. 1C, regulator controller 120 may change or maintain the regulator operational characteristics of regulator 120 based on the change indication received by regulator communications module 124, and based on an output increase function, such as output increase function 610 (FIG. 6A), or an output decrease function, such as output decrease function 620 (FIG. 6B).

As described above, some power regulators 110 (e.g., power regulators 110-11, 110-12, . . . , 110-1M) may be connected in series, thus defining a string of power sources 108 (e.g., string 106-1). In such a string, the current flowing through power regulators 110 may be equal. However, in some examples, the power produced by each one of power regulators 110 may differ, and each one of power regulators 110 may produce a different voltage (e.g., when the string produces maximum power). In some examples, the differences in voltage or power may be significant where one of power regulators 110 in the string produces significantly more power than another one of power regulators 110 (e.g., where power production between power regulators 110 in the string of power sources 108 may be unevenly distributed). As mentioned above, the uneven distribution of power production may result in an increase in temperature of some power regulators 110, which may increase the probability of regulator failure and damage (e.g., a reduction in the Mean Time Between Failures-MTBF), and may even result in fire. According to aspects of the disclosure herein, each one of power regulators 110 may employ a respective characteristic curve stored therein, which may comprise a droop over an operating range. The characteristic curve may define a relationship between two or more determined output characteristics of the power regulator. In particular, the droop in the characteristic curve may define a one-to-one correspondence between determined output characteristics of a power regulator (e.g. over a selected range of currents, voltages, or powers). A droop in a characteristic curve, discussed below, may reduce the difference between the determined output characteristics of power regulators 110 in the string of power sources 108.

Figure 7A:
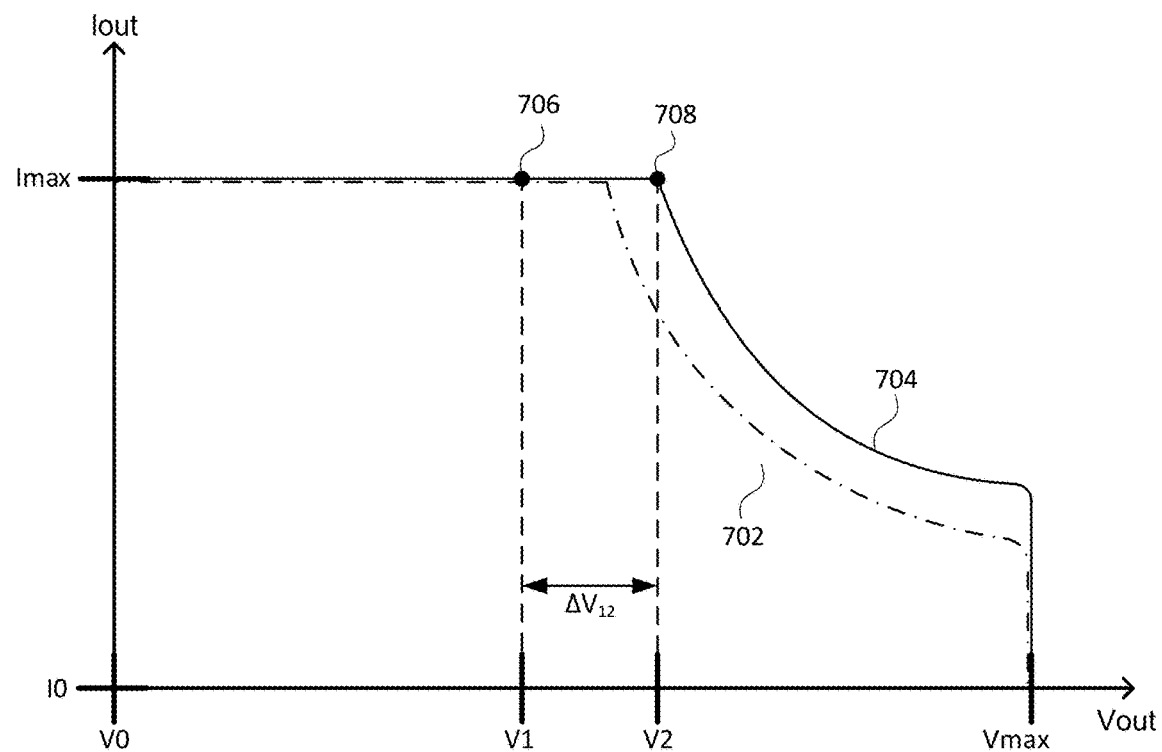
FIGS. 7A and 7B illustrate examples of regulator characteristic curves of two power regulators connected in series, in accordance with aspects of the disclosure herein.
Figure 7B:
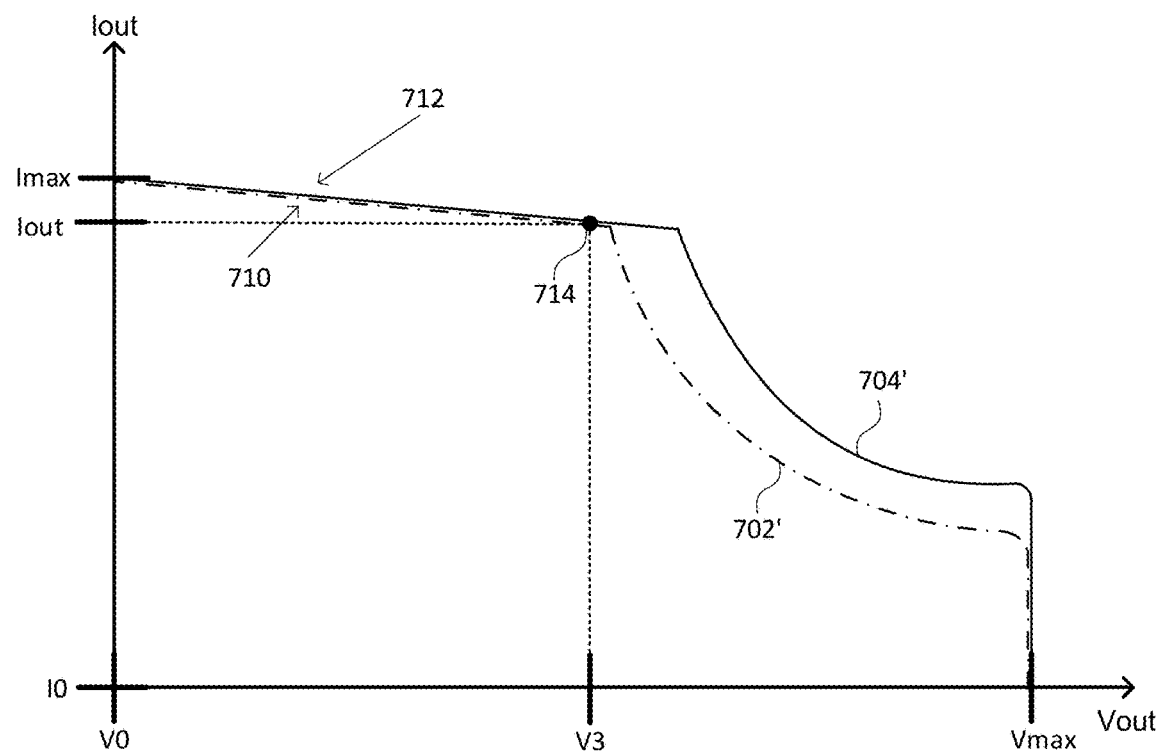

Reference is now made to FIGS. 7A and 7B, which are examples of regulator characteristic curves of two power regulators 110, where the two power regulators are connected in series (e.g., a series string comprised of two power sources), in accordance with aspects of the disclosure herein. In FIGS. 7A and 7B, the regulator characteristic curves may be current versus voltage curves (I-V curves). These I-V curves may define the relationship between output voltages and output currents of power regulator 110. Power regulator 110 may produce power according to the I-V curve associated with power regulator 110. FIG. 7A depicts an I-V curve 702 of a first power regulator and an I-V curve 704 of a second power regulator, where both power regulators may be connected in series in the same string of power regulators. I-V curve 702 and I-V curve 704 may be determined, stored, or received by the power regulator. As illustrated in FIG. 7A, both power regulators may produce (e.g., at a particular moment or over a time period) the same current, Iout, since the regulators may be connected in series. However, there may be multiple voltages corresponding to Iout on I-V curve 702 and on I-V curve 704, which may correspond to the sum of voltages produced by the series connection of the first and the second power regulators. In FIG. 7A, the first power regulator may operate at point 706 on curve 702, which may correspond to voltage V1 and the second power regulator may operate at point 708 on curve 704, which may correspond to voltage V2. In the example in FIG. 7A, point 708 may be an example of the MPP at which the second regulator may operate. The voltage difference between V2 and V1 may be depicted in FIG. 7A as $\Delta V_{12}$.

FIG. 7B depicts an I-V curve 702' of a third power regulator and an I-V curve 704' of a fourth power regulator. In FIG. 7B, I-V curve 702' comprises a droop 710 and curve 704' comprises a droop 712, where both droops are over a selected range of currents in which each power regulator 110 may operate. Droop 710 on I-V curves 702' and droop 712 on I-V curve 704' may define a one-to-one correspondence between voltages and currents over the selected range of currents or voltages. In the example of FIG. 7B, droop 710 and droop 712 may define the same one-to-one correspondence between voltages and currents over a corresponding range of currents or voltages. In such examples, one voltage may correspond to each current. In FIG. 7B, both power regulators may produce a current Iout. However, both the third power regulator and the fourth power regulator may operate at the same point 714, which may correspond to a voltage V3.

In FIG. 7B, droop 710 of I-V curves 702' and droop 712 of I-V curve 704' are depicted as the same linear function. However, such linear droops are described herein as an example only and should not be considered as limiting. Droops 710 and 712 may be different lines intersecting the Y-axis at Imax, however, droops 710 and 712 may intersect the Y-axis at currents other than Imax. In some examples, when different droop lines (e.g., different slopes) are employed, the operating voltage of each regulator may be different (e.g., a V1' for the first regulator, and V2' the second regulator), but the difference between these voltages (e.g., $\Delta V'_{12}$) may be smaller than if no droops were employed (e.g., $\Delta V'_{12} < \Delta V_{12}$). The droops may be logarithmic functions, polynomial functions, or the like. Curves which comprise droops, such as droop 710, over the operating current of power regulators 110 in a string may reduce the maximum possible difference of output voltages or the output power of power regulators 110 in the same string.

FIGS. 7A and 7B illustrate characteristics curves for regulating power in a string 106 of power regulators 110 where power regulators 110 may be connected in series (e.g., as similarly depicted in FIG. 1A). However, as depicted in FIG. 1B, in some examples, power regulators 110 may be connected in parallel in string 106. When string 106 is comprised of power regulators 110 connected in parallel, the voltage produced by each power regulator 110 in the string may be equal. The current or power produced by each power regulator 110 may differ. Thus, the power production between power regulators 110, connected in parallel in string 106 of power source 108, might not be distributed evenly. According to aspects of the disclosure herein, and as described above in conjunction with FIGS. 7A and 7B, each one of power regulators 110 may employ a characteristics curve stored therein, which may comprise a droop over a selected range of the output characteristics of power regulators 110.

Figure 8A:
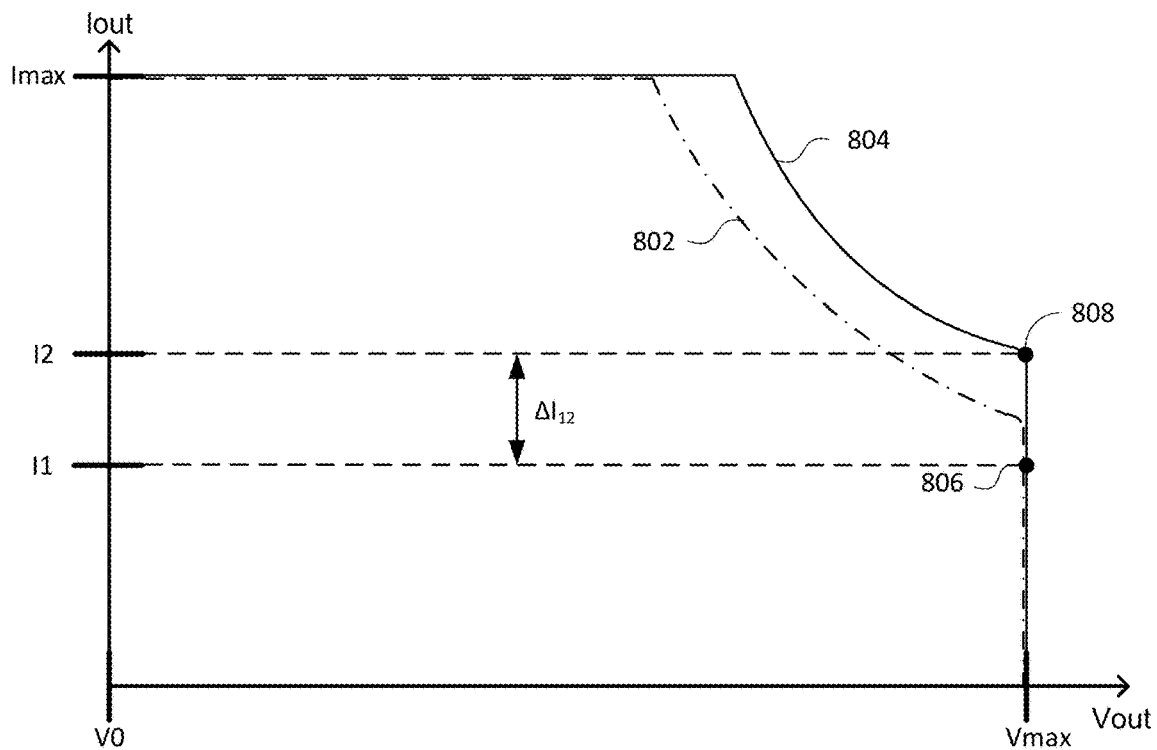
FIGS. 8A and 8B illustrate examples of regulator characteristic curves of two power regulators connected in parallel, in accordance with aspects of the disclosure herein.
Figure 8B:
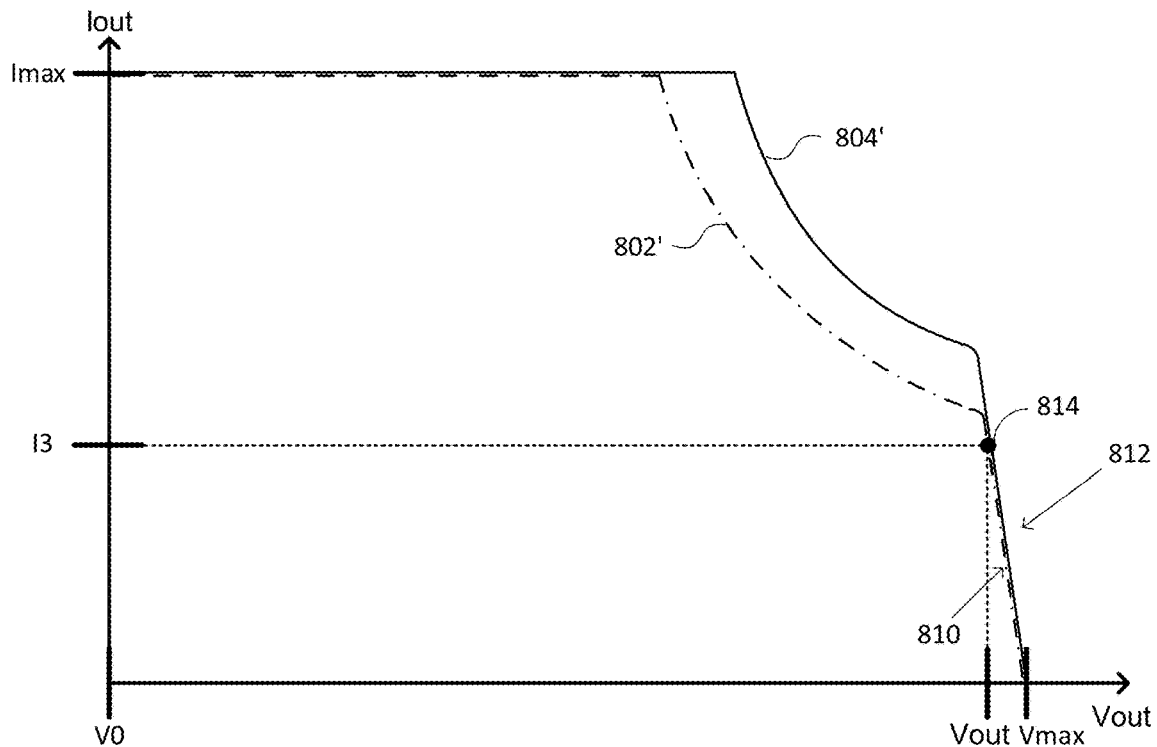

Reference is now made to FIGS. 8A and 8B, which depicts examples of characteristic curves of two power regulators 110, where the two power regulators 110 are connected in parallel (e.g., in a parallel string of two power sources). In FIGS. 8A and 8B, the characteristic curves may be I-V curves, which may define a relationship between output voltages and output currents of the two power regulators 110. Each power regulator 110 may produce power according to the I-V curve associated with power regulator 110. FIG. 8A depicts I-V curve 802, which may be associated with a first power regulator, and I-V curve 804, which may be associated with a second power regulator. The first power regulator and the second power regulator may be connected in parallel in the same string of power regulators 110, as illustrated in FIG. 1B. Both power regulators may produce a voltage, Vout. However, there may be multiple currents corresponding to Vout on I-V curve 802 and I-V curve 804, which may correspond to the sum of currents produced by the parallel connection of the power regulators. As illustrated in FIG. 8A, the first power regulator may operate at point 806 on curve 802, which may correspond to a current I1. As further illustrated in FIG. 8A, the second power regulator may operate at point 808 on curve 804, which may correspond to a voltage I2. The difference between I2 and I1 may be depicted in FIG. 8A as $\Delta I_{12}$.

FIG. 8B depicts I-V curve 802', stored in a third power regulator, and I-V curve 804', stored in a fourth power regulator. In FIG. 8B, I-V curve 802' comprises a droop 810 and curve 804' comprises a droop 812, wherein droop 810 and droop 812 are both over a selected range of currents or voltages in which each of power regulator 110 operates. Droop 810 on I-V curve 802' and droop 812 on curve 804' may identify a one-to-one correspondence between voltages and currents over the selected range of currents or voltages. As illustrated in FIG. 8B, droop 810 and droop 812 identify the same one-to-one correspondence between voltages and currents over a corresponding range of currents or voltages. As such, there may be one current corresponding to each voltage. As illustrated in FIG. 8B, both power regulators may produce a voltage Vout. However, both the third power regulator and the fourth power regulator may operate at the same point 814, which may correspond to a current Iout. Droops 810 and 812 may be different lines intersecting on the X-axis at Vmax, however droops 810 and 812 may intersect the X-axis at voltages other than Vmax. In some examples, different droop lines may be employed and the operating point of each regulator may be different, but the difference between the corresponding currents may be smaller than when droops might not be employed. Similar to droops 710 and 712, as illustrated in FIG. 7B, droops 810 and 812 may be linear logarithmic functions, polynomial functions, or the like. Curves which comprise droops, such as droop 810, over the operating current of power regulators 110 in string 106 may reduce the maximum possible difference between output voltages or the output power of the power regulators in the string.

For examples, FIGS. 7A-7B, and 8A-8B describe using a droop in an I-V curves of a power regulator 110. A droop may be used in other characteristic curves of a power regulator 100. A characteristic curve may relate a measured operational characteristic to a controlled operational characteristic. The measured operational characteristic may be an input voltage (Vin), an output voltage (Vout), an input current (Iin), an output current (Iout), an input power (Pin), an output power (Pout) regulator temperature, a lifetime, a duty cycle, an input frequency (e.g., frequency may be zero in case of DC input), an output frequency (e.g., may be zero in case of DC output), or a switching frequency. The controlled operational characteristic may also be Vin, Vout, Iin, Iout, Pin, Pout, a regulator temperature, a lifetime, a duty cycle, an input frequency, an output frequency, or a switching frequency. A selection of the measured operational characteristic and the controlled operational characteristic may relate to a performance (e.g., efficiency, losses, lifetime) of power regulator 110. For example, in case power converter 122 in power regulator 110 is a buck converter (or operates as a buck converter), the measured operational characteristic may be a temperature and the controlled operational characteristic may be Iout (e.g., since Iout may be a factor in losses of a buck converter). In case power converter 122 in power regulator 110 is a boost converter (or operates as a boost converter), the measured operational characteristic may be a temperature and the controlled operational characteristic may be Vout (e.g., since Vout may be a factor in losses of a boost converter).

Figure 9A:
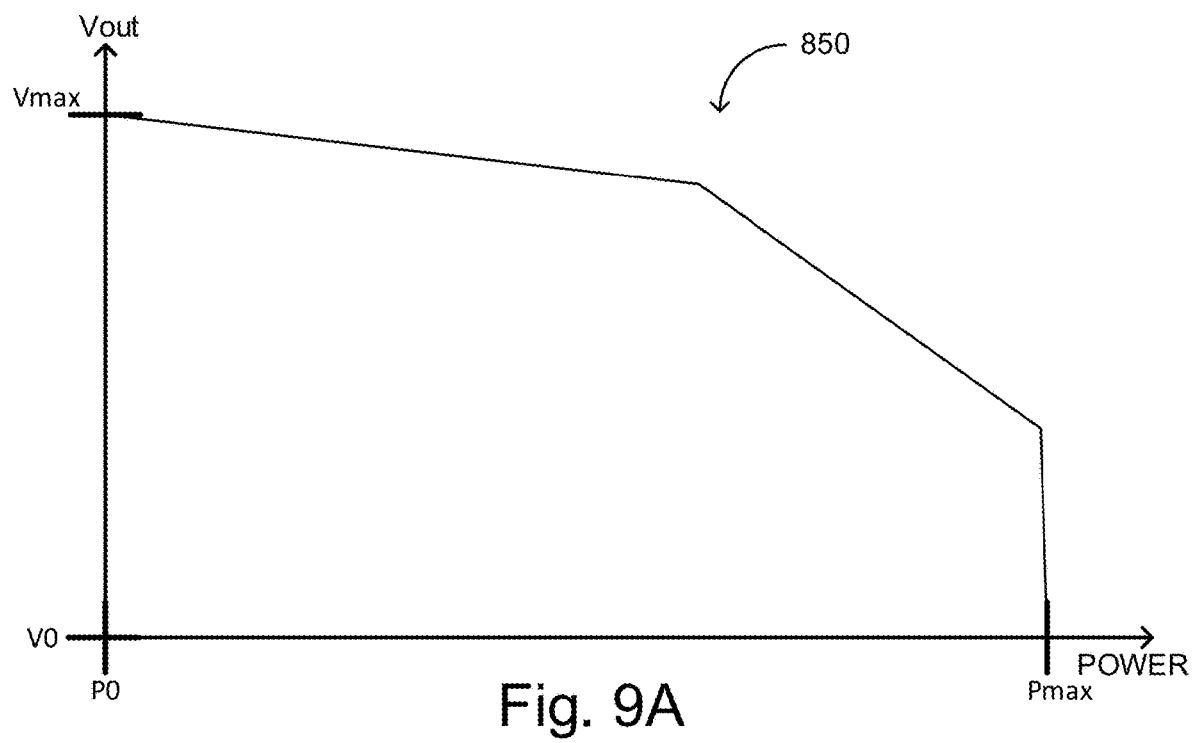
FIGS. 9A-9E illustrate examples of various characteristic curves which may be used to reduce differences between operational characteristics of power regulators in an array of power regulators, in accordance with aspects of the disclosure herein.
Figure 9B:
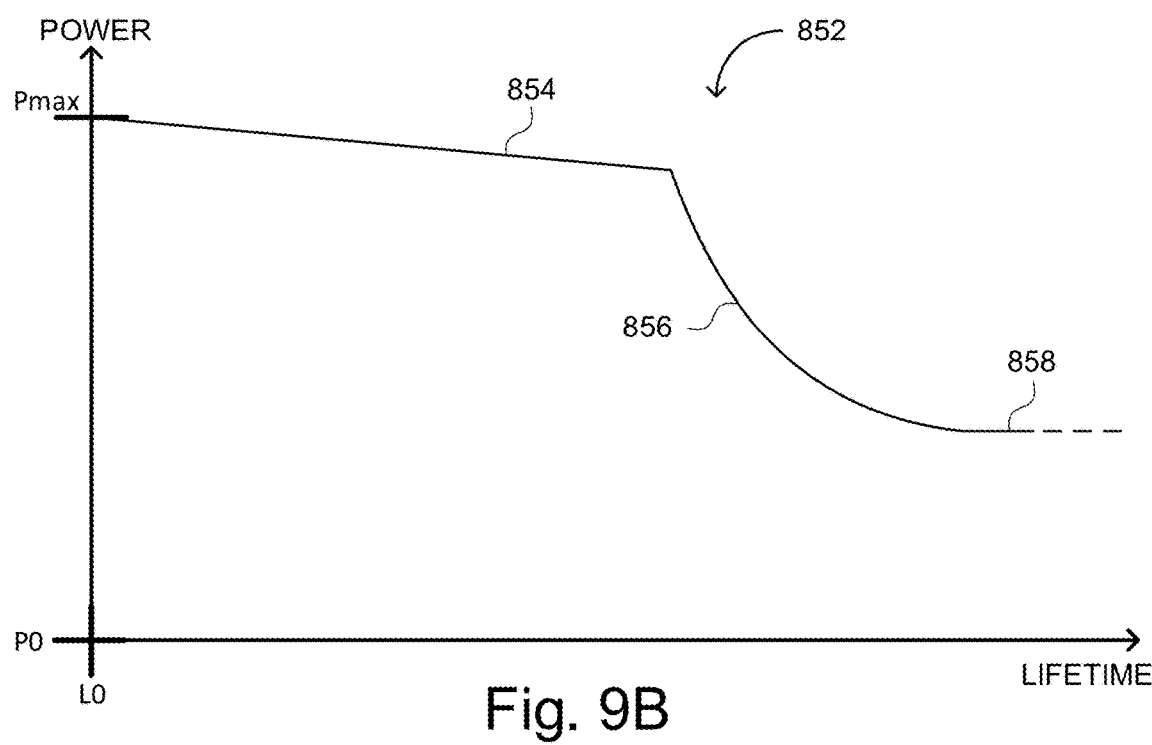

Reference is now made to FIGS. 9A-9E which illustrate examples of various characteristic curves which may be used to reduce differences between operational characteristics of power regulators 110 in an array of power regulators 102, in accordance with aspects of the disclosure herein. FIG. 9A describes a characteristic curve 850, which is an example of a characteristic curve of output voltage (Vout) versus power. Characteristic curve 850 may be a piecewise linear function. FIG. 9B describes characteristic curve 852, which is an example of a characteristic curve of output power versus lifetime of the power regulator 110. Characteristic curve 852 may have a linear section 854, a non-linear section 856, and a constant section 858. The lifetime of the power regulator 110 may be measured, for example, in hours, days, or years of operation. The lifetime measurement may be weighted by the operating temperature, operating power, output voltage, or the like. For example, a power regulator 110 that operated for an hour at a temperature of 80 degrees centigrade may have a measured lifetime which will be higher than a power regulator 110 that operated for an hour at a temperature of 70 degrees centigrade. A power regulator 110 that operated for a day with an output voltage of 90V, may have a measured lifetime which will be higher than a power regulator 110 that operated for a day with an output voltage of 80V.

Figure 9C:
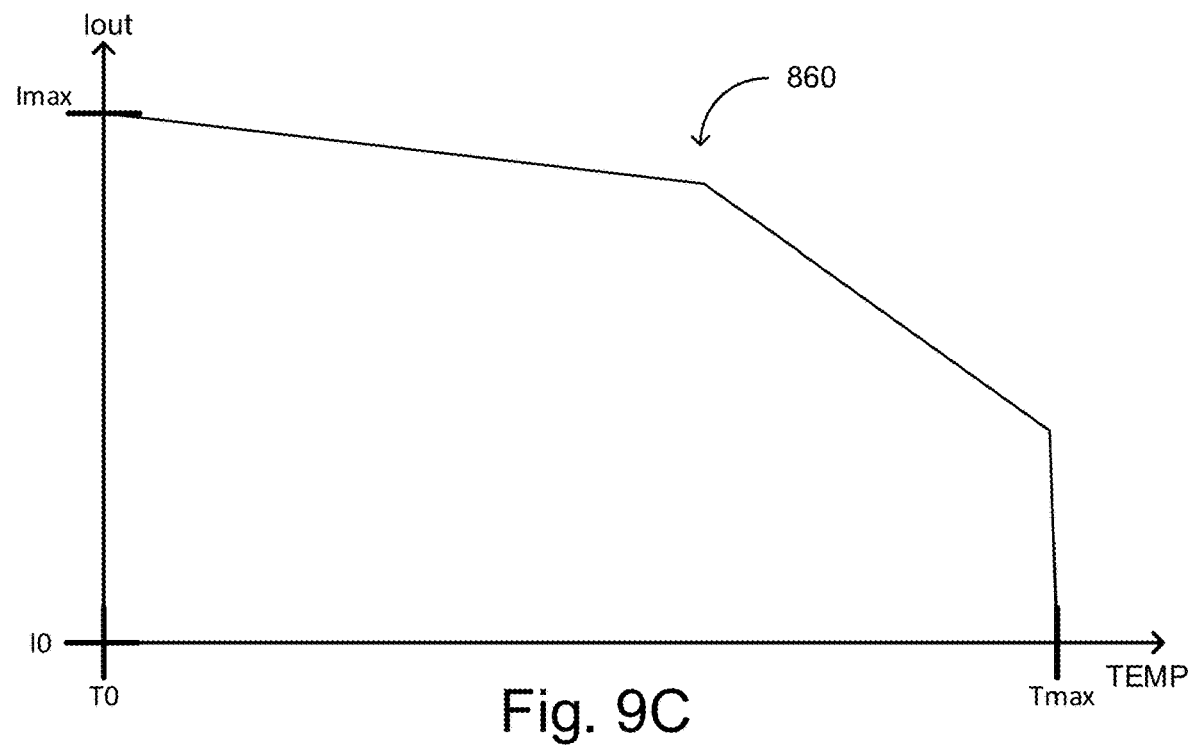
Figure 9D:
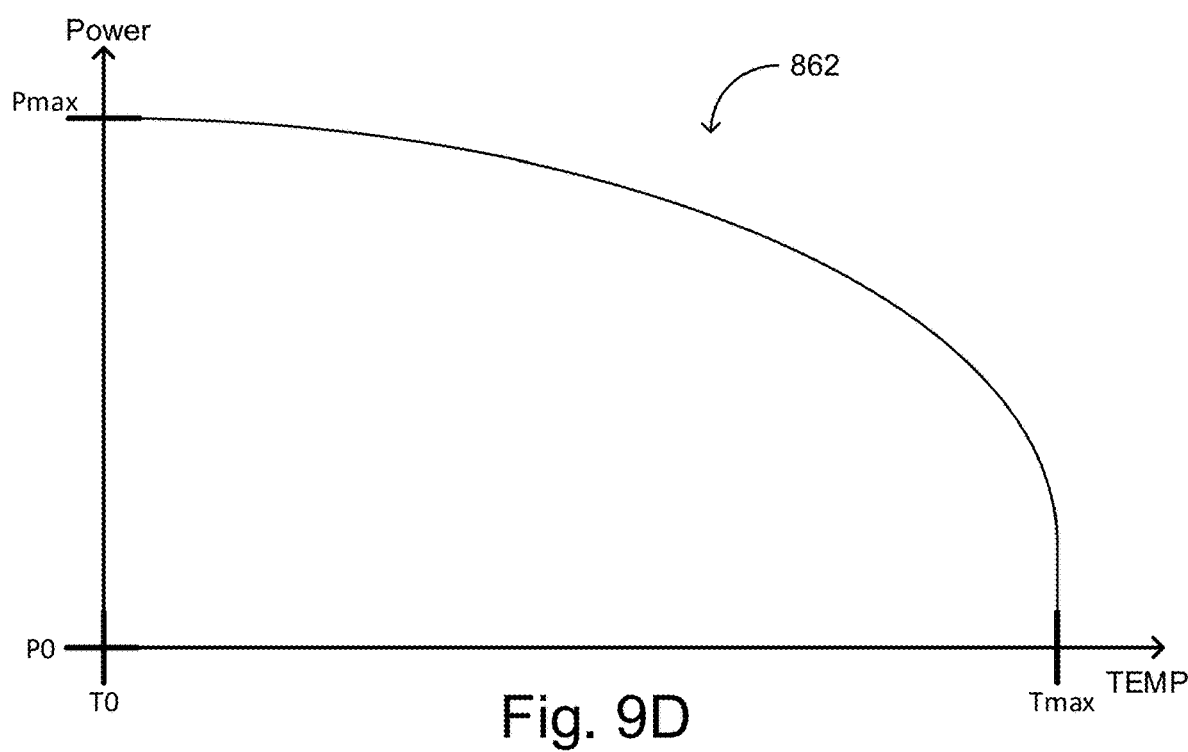
Figure 9E:
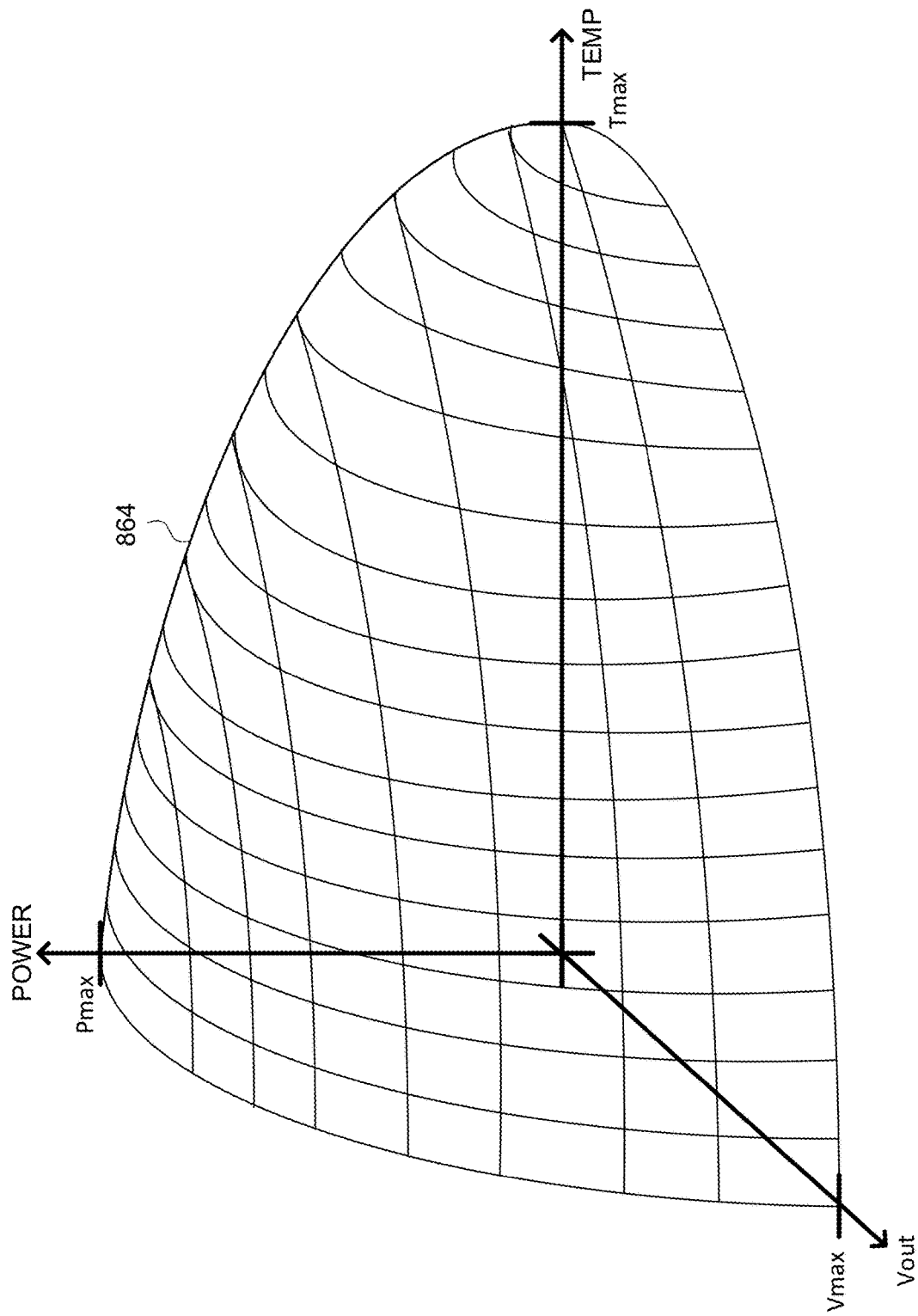

FIG. 9C describes a characteristic curve 860, which is an example of a characteristic curve of output current (Iout) versus power temperature (e.g., operating temperature, ambient temperature). Characteristic curve 860 may be a piecewise linear curve. FIG. 9D describes a characteristic curve 866, which is an example of a characteristic curve of power versus power temperature. Characteristic curve 862 may be a non-linear curve. A characteristic curve according to the disclosure herein may be a multidimensional curve. FIG. 9E described a multidimensional characteristic curve 864 of output power versus output voltage and temperature. Power regulator 110 may determine the output power based on the combination of measured output voltage and measured temperature. According to the disclosure herein, a power regulator 110 may control an operational characteristic based on more than one characteristic curve. For example, power regulator 110 may control an operational characteristic based on a first characteristic curve (e.g., for balancing power production), and control a second operational characteristic based on a second characteristic curve. For example, power regulator 110 may control Vout based on temperature for balancing power production, and may control Vin based on Vout (e.g., for MPP operation). For example, power regulator 110 may control Pout based on lifetime for balancing power production, and may control Vout based on temperature.

The examples discussed above in conjunction with FIGS. 1A-IC, 2, 3A-3E, 4A-4D, 5, 6A-6C, 7A-7B, 8A-8B, 9A-9E described power production balancing. However, according to the disclosure herein, power sources 108 may also be power sinks (e.g., energy storage devices such as batteries, capacitors, or flywheels), or may be replaced with power sinks. In some examples, power balancing may be associated with balancing power consumption by power sinks (e.g., power storage device, such as batteries, during charging). For example, referring back to FIGS. 1A and 1B, each one of power regulators 110 may be a bi-directional regulator configured to either draw power from the power sink or to provide power to the power sink. Central module 101 may be configured to provide power to array of power sources 102. When power regulators 110 provide power to the power sinks, the regulation indication may relate to charging power, charging current, or charging voltage of the power sink. For example, balancing the charging and the discharging of the power sources (or power sinks) in an array of power sources (or power sinks) may also comprise balancing the number of charge and discharge cycles of the power sources (or power sinks) in the array.

In an array of power sources, such as array of power sources 102 depicted in FIGS. 1A and 1B, one or more of power regulators 110 may fail or create a short circuit. In some examples, the resistance may be reduced in the string where the failed power regulator 110 is connected, and power from parallel strings may be diverted to the shorted string. Therefore, a large current may flow through the string in which the shorted power regulator may be located, and the temperature of the power regulators in that string may increase. Such an increase in temperature may lead to overheating and may increase the risk of fire.

Figure 10:
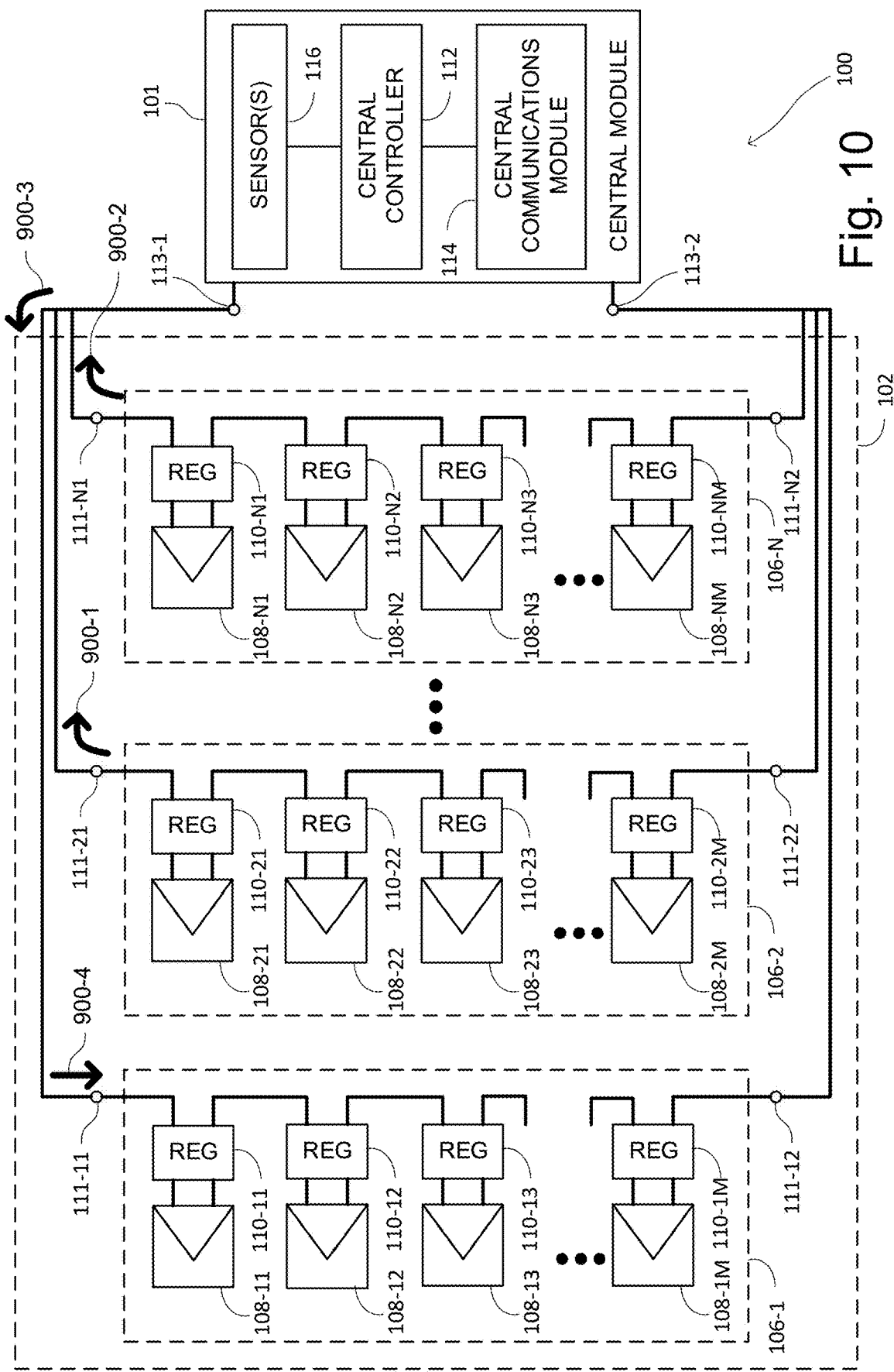
FIG. 10 illustrates an example of a photovoltaic power system in which power regulators in a string may be short circuited, in accordance with aspects of the disclosure herein.

Reference is now made to FIG. 10, which depicts power system 100, in accordance with the disclosure herein. As illustrated in FIG. 10, power regulators 110 in string 106-1 may be short circuited (e.g., due to malfunction). Therefore, the currents of strings 106-2, . . . , 106-N, or portions thereof, may be directed to string 106-1 instead of central module 101, as indicated by arrows 900-1, 900-2, 900-3, and 900-4. Directing current from one string to other strings may be referred to herein as "power leakage" or "fault". Power leakage may result from a ground fault occurring (e.g., when a point of string 106 shorts to ground) or from a line-to-line fault occurring (e.g., when two points of the same string or two points on different strings are shorted). During power leakage, the resistance of the shorted string may be reduced. In some examples, a shorted string may turn into a power load instead of a power source.

Figure 12:
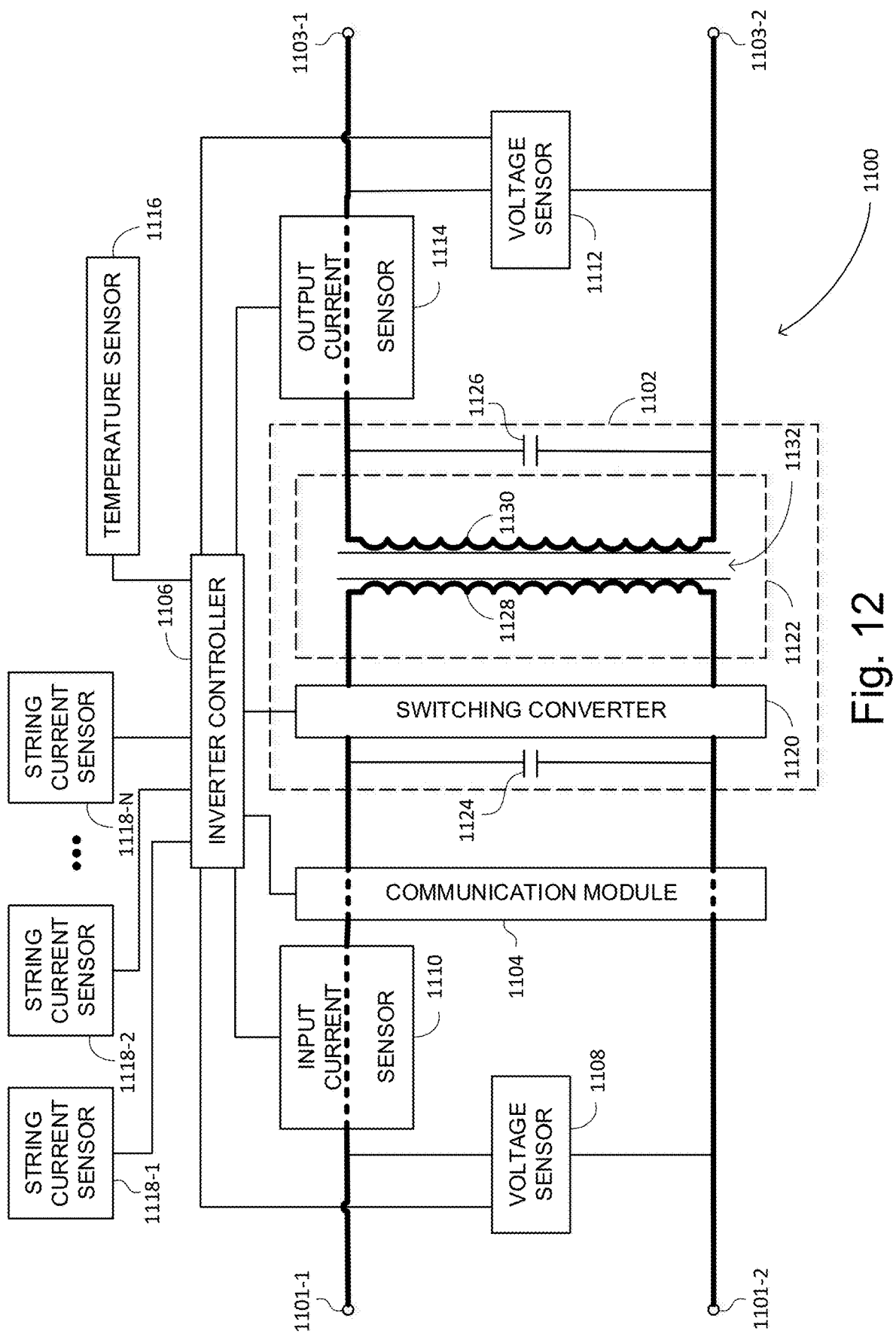
FIG. 12 illustrates an example in which a central module is implemented as an inverter, in accordance with aspects of the disclosure herein.

Central controller 112 of central module 101 may be configured to detect a power leakage. For example, central module 101 may detect a power leakage based on a comparison of determined input voltage, input current, or input power, and actual input voltage, input current, or input power. Central controller 112 may be configured to control central communications module 114 to repeatedly transmit an expected regulator output or an increase indication (e.g., a determined number of times or for a determined time-period). However, central controller 112 may determine, based on signals relating to (e.g., indicating) the input voltage or input current of central module 101 (e.g., received from sensors(s) 116), that the actual input voltage, input current, or input power might not match the determined input voltage, input current, or input power. The determined input voltage, input current, or input power may be pre-defined or may be defined by determined output power when central module 101 is an inverter (e.g., inverter 1100, as illustrated in FIG. 12). Central controller 112 may be configured to determine that a power leakage exists and may transmit, via central communications module 114, an expected regulator output with a determined safe value. In some examples, the safe value may be predetermined (e.g., a value less than 100 W and preferably less than 15 W). In some examples, the safe value may be either a percentage of the expected input power at the input of central module 101 or a percentage of the available input power at input terminals 113-1 and 113-2 of central module 101 (e.g., less than 10% from the available input power).

Each one of power regulators 110 may be configured to transmit a signal relating to (e.g., indicating) the regulator operational characteristics (e.g., output voltage, output current, output power, operating temperature, or DC-DC converter duty cycle). Central communications module 114 may be configured to receive these signals from power regulators 110. Central controller 112 may determine if a power leakage exists based on the received signals relating to (e.g., indicating) the regulator operational characteristics. For example, central controller 112 may be configured to sum the powers produced by power regulators 110 based on the received signals from each power regulator 110, and to compare the sum to a measured input power at inverter input terminals 113-1 and 113-2 (e.g., as sensor(s) 116). Based on the sum of powers being higher than the measured input power, central controller 112 may determine that a power leakage exists. In some examples, a power leakage may indicate that at least one of power regulators 110 might not produce the indicated power, although that power regulator may transmit an indication that it produces power. Based on determining that a power leakage exists, central controller 112 may be configured to transmit, via central communications module 114, an expected regulator output with a determined safe value.

If one or more power regulators 110 of strings 106 in array of power sources 102 is short circuited, the voltage across the corresponding short circuited string may also be reduced. Consequently, the voltage across the other strings and across input terminals 113-1 and 113-2 of central module 101 may also be reduced. For example, if string 106-1 is short circuited, the voltage across input terminals 113-1 and 113-2 of central module 101 may be reduced. Consequently, the output voltage of each of power regulator 110 may also be reduced.

Central controller 112 may be configured to determine that a power leakage exists based on receiving signals from power regulators 110 indicating to the output voltages thereof, determining a sum of the output voltages received from each power regulator 110, and comparing the sum to the determined input voltage of central module 101. Based on the sum of voltages being lower than the input voltage determined by central module 101, central controller 112 may determine that a power leakage exists. Central controller 112 may be configured to determine that a power leakage exists based on the sum of voltages being lower than a predetermined value (e.g., equal to or less than 100V, equal to or less than 50V) or a percentage of the expected input voltage (e.g., equal to or less than 50%, equal to or less than 10% of the expected input voltage).

Central controller 112 may be configured to determine (e.g., based on received signals relating to (e.g., indicating) the output voltage, output current, or output power) whether the currents of power regulators 110 (e.g., power regulators 110-11, 110-12, 110-13 . . . , 110-1M in string 106-1) may be negative. In some examples, central controller 112 may be configured to determine, based on the received signals, whether a power regulator (e.g., power regulator 110-12) may fail to produce power. Central controller 112 may be configured to determine that a power leakage exists based on not receiving a signal from some of power regulators 110 (e.g., from power regulator 110-12). In such instances, central controller 112 may determine that a power leakage exists. Central controller 112 may be configured to transmit, via central communications module 114, an expected regulator output with a determined safe value.

If a string experiences a partial short circuit, power regulators 110 may increase the output voltage thereof to compensate for the faulty power regulator. For example, power regulator 110-12 in string 106-1 may be short circuited. Consequently, the output voltage of the other power regulators 110 in string 106-1 may increase to compensate for power regulator 110-12 (e.g., the remaining power regulators 110 in string 106-1 may output the maximum voltage). Central controller 112 may be configured to determine that a power leakage exists based on receiving signals from power regulators 110 relating to (e.g., indicating) the output voltages and based on using the received signals to identify power regulators that may generate the maximum output voltage.

Central module 101 (e.g., using central controller 112) may be configured to determine that a power leakage exists based on measured loop resistance of array of power sources 102. For example, if central module 101 is an inverter, central controller 112 may control a switching converter to produce a determined voltage at input terminals 113-1 and 113-2 of central module 101. Central controller 112 may be configured to receive signals indicating voltage or current measurements from sensor(s) 116. Based on the voltage or current measurements, central controller 112 may determine the loop resistance of array of power sources 102 (e.g., by dividing the measured voltage by the measured current). Furthermore, central controller 112 may determine an expected resistance based on the determined voltage at input terminals 113-1 and 113-2, and based on the measured current. Based on the determined loop resistance being lower than the expected resistance, central controller 112 may determine that a power leakage exists.

Figure 11:
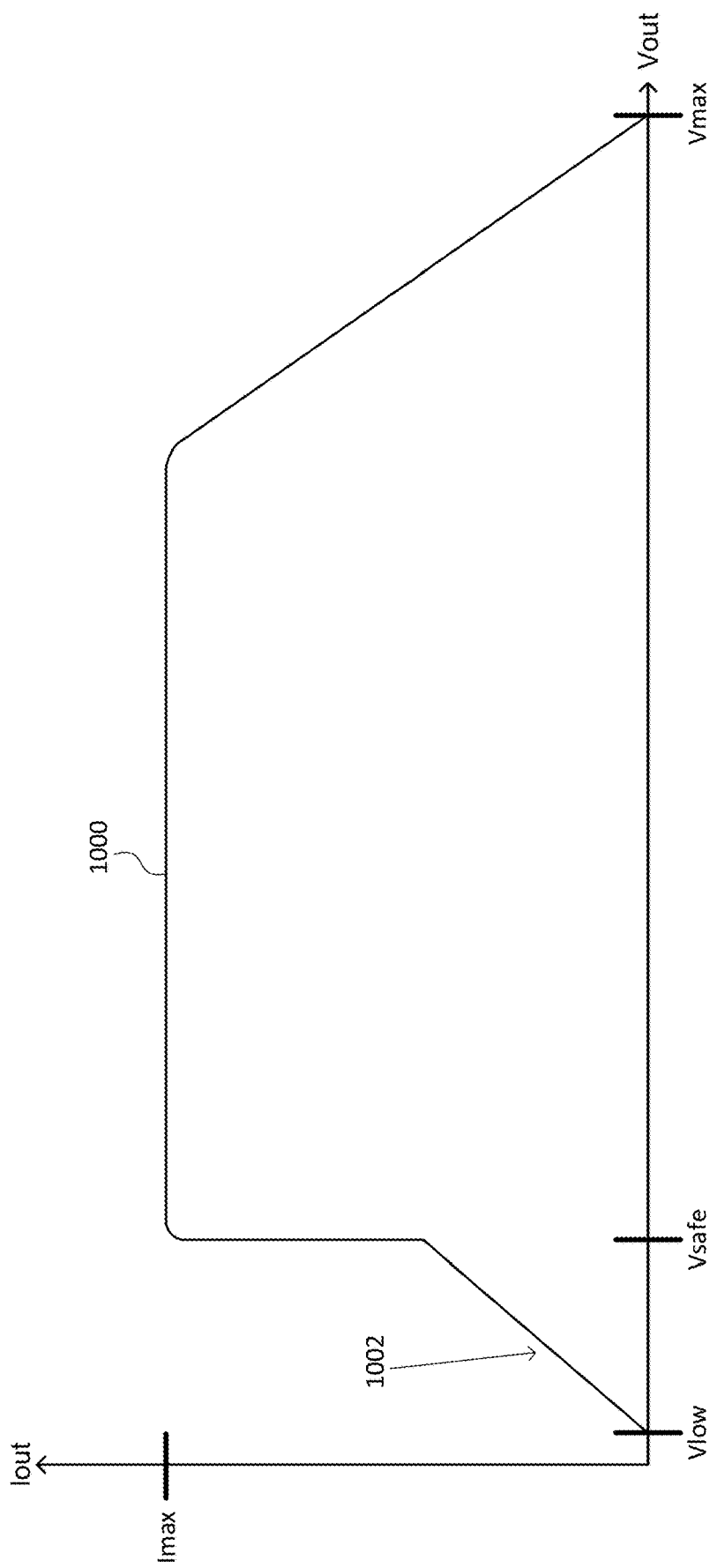
FIG. 11 illustrates an example of an output current versus output voltage characteristic curve of a power regulator, in accordance with aspects of the disclosure herein.

The risks resulting from a fault may be reduced by limiting the output current or power for low output voltages of power regulators 110. Reference is now made to FIG. 11, which depicts an example of a characteristic curve 1000. In FIG. 11, characteristic curve 1000 may be an output current versus output voltage (I-V) curve that is associated with a power regulator 110. I-V curve 1000 may illustrate a one-to-one relationship between output voltage and output current, as indicated by incline 1002, over an output voltage Vlow and an output voltage Vsafe, where Vsafe may be higher than Vlow (e.g., Vlow may be zero or higher). When a power regulator may be short circuited, the output voltage of the power regulator may be reduced. Based on the output voltage of the power regulator being below Vsafe, the output current may also be reduced according to the one-to-one relationship (e.g., incline 1002) on curve 1000. Thus, the current flowing out of the string may also be reduced, thereby reducing the risks resulting from a fault.

As mentioned above, central module 101, as illustrated in FIGS. 1A and 1B, may be an inverter configured to convert DC power received from array of power sources 102. Reference is now made to FIG. 12, which illustrates an example in which central module 101 is an inverter. As illustrated in FIG. 12, inverter 1100 may comprise power converter 1102, inverter communications module 1104, inverter controller 1106, inverter input terminals 1101-1 and 1101-2, and inverter output terminals 1103-1 and 1103-2. Inverter 1100 may comprise one or more sensors, such as input voltage sensor 1108, input current sensor 1110, output voltage sensor 1112, output current sensor 1114 and temperature sensor 1116. Inverter 1100 may comprise string current sensors, such as string current sensors 1118-1, 1118-2, . . . , 1118-N. Power converter 1102 may comprise switching converter 1120. Power converter 1102 may comprise transformer 1122. Power converter 1102 may comprise input capacitor 1124 or output capacitor 1126. Transformer 1122 may comprise primary windings 1128, secondary windings 1130, wherein primary windings 1128 and secondary windings 1130 may be wound around common core 1132. Common core 1132 may comprise of one or more ferromagnetic materials.

Inverter controller 1106 may be connected to switching converter 1120 and to inverter communications module 1104. Inverter controller 1106 may be further connected input voltage sensor 1108, input current sensor 1110, output voltage sensor 1122, output current sensor 1114, and temperature sensor 1116. The input of switching converter 1120 may be connected to inverter input terminals 1101-1 and 1101-2. The output of switching converter 1120 may be connected to primary windings 1128 of transformer 1122. Secondary windings 1130 of transformer 1122 may be connected to inverter output terminals 1103-1 and 1103-2 of inverter 1100. Input capacitor 1124 may be connected across inverter input terminals 1101-1 and 1101-2. Output capacitor 1126 may be connected across inverter output terminals 1103-1 and 1103-2. Input voltage sensor 1108 may be connected between inverter input terminals 1101-1 and 1101-2. Output voltage sensor 1112 may be connected between inverter output terminals 1103-1 and 1103-2. Input current sensor 1110 may be connected to inverter input 1101-1. Output current sensor 1114 may be connected to inverter output 1103-1. Inverter controller 1106 may be connected to string current sensor 1118-1, 1118-2, . . . , 1118-N.

Switching converter 1120 may be implemented by a transistor half-bridge, full-bridge (e.g., an H-Bridge), flying capacitor, cascaded-H-bridge, Neutral Point Clamped (NPC), A-NPC, or a T-type NPC inverting circuit employing two or more conversion levels. Switching converter 1120 may be operated (e.g., by inverter controller 1106) by employing a pulse width modulation (PWM) signal. Switching converter 1120 may operate at a switching frequency between 1 Hz-10 MHz. For example, where switching converter 1120 comprises one or more power field-effect transistors ("FET"), switching converter 1120 may be operated at a switching frequency between 16 KHz-200 KHz (e.g., frequencies at which switching losses may be greatly reduced for power FETs operating in a resonant circuit). In some examples, switching converter 1120 may operate at a switching frequency of 30 KHz.

In some examples, transformer 1122 may be a step-up transformer in which the number of windings in secondary windings 1130 may be larger than the number of windings in primary windings 1128. In some examples, transformer 1122 may be a step-down transformer in which the number of windings in secondary windings 1130 may be smaller than the number of windings in primary windings 1128. A voltage on a secondary side of a transformer (i.e., on secondary windings 1130) may be given by Vsec=Vprim*N/M, where Vsec may represent a voltage on the secondary side, Vprim may represent a voltage on the primary side of the transformer (e.g., primary windings 1122), M may be the number of turns of windings on the primary side, and N may be the number of turns of windings on the secondary side. In some transformers, when M is equal to N, Vsec may be equal to Vprim (i.e., the output voltage is equal to the input voltage). In a step-up transformer, when M is greater than N, Vsec may be greater than Vprim (i.e., the output voltage is larger than the input voltage). In a step-down transformer, when M is less than N, Vsec may be less than Vprim (i.e., the output voltage is smaller than the input voltage).

Transformer 1122 may also provide galvanic isolation between inverter input terminals 1101-1 and 1101-2, and inverter output terminals 1103-1 and 1103-2. In addition, one or both of primary windings 1128 or secondary windings 1130 may be encapsulated in a resin, such as epoxy (e.g., cast in a vacuum to reduce the number of air bubbles). Primary windings 1128 and secondary windings 1130 may be wound around common core 1132, which may comprise ferromagnetic materials. Primary windings 1128 and secondary windings 1130 may each comprise bifilar windings, and each one of primary windings 1128 and secondary windings 1130 may be wound on a different leg of common core 1132. In operation, switching converter 1120 may receive DC voltage at input terminals 1101-1 and 1101-2. Input capacitor 1124 may stabilize the voltage between inverter inputs 1101-1 and 1101-2. Switching converter 1120 may generate a pulsed output at the input of transformer 1122. Transformer 1122 may step-up, step-down, or maintain the voltage generated by switching converter 1120. Output capacitor 1126 may filter the output from transformer 1122 to generate an AC voltage between inverter outputs 1103-1 and 1103-2.

Input voltage sensor 1108 may be configured to measure the voltage between inverter input terminals 1101-1 and 1101-2, and to provide a measurement of the input voltage to inverter controller 1106. Output voltage sensor 1112 may be configured to measure the voltage between inverter output terminals 1103-1 and 1103-2, and to produce a measurement of the output voltage to inverter controller 1106. Input voltage sensor 1108 or output voltage sensor 1112 may be based on a resistive or capacitive divider, a resistive or capacitive bridge, comparators (e.g., employing operational amplifiers), or the like. Input current sensor 1110 may be configured to measure the currents through inverter input terminal 1101-1, and to provide a measurement of the input current to inverter controller 1106. Output current sensor 1114 may be configured to measure the currents through inverter output terminal 1103-1, and to provide a measurement of the input or output current to inverter controller 1106. Input current sensor 1110 and output current sensor 1114 may comprise a Current Transformer ("CT") sensor, Hall effect sensor, zero flux sensor, or the like.

Inverter communications module 1104 may be configured to transmit a signal (e.g., communications module 1104 may be a simplex transmitter). The signals may comprise broadcast signals, multicast signals, or unicast signals. Communications module 1104 may also be configured to receive a signal (e.g., communications module 1104 may be a half-duplex or full-duplex transceiver). Inverter communications module 1104 may transmit a signal to all power regulators 110, to a group of power regulators 110 (e.g., to string 106), or to a single power regulator 110, as described above in conjunction with FIGS. 1A-IC, 2, 3A-3E, 4A-4D, 5, 6A-6C.

Inverter controller 1106 may be configured to control switching converter 1120 (e.g., by controlling switches in switching converter 1120). Inverter controller 1106 may be configured to provide inverter communications module 1104 with signals relating to power production in power system 100 (e.g., signals relating to (e.g., indicating) power regulation indications such as expected regulator output, increase indications, decrease indications, or maintain indications). Inverter communications module 1104 may be configured to receive signals (e.g., from power regulators 110) relating to (e.g., indicating) power production in power system 100 (e.g., signals relating to (e.g., indicating) determined regulator operational characteristics of power regulators 110). The signals relating to (e.g., indicating) power production in power system 100 may be transmitted and received periodically. Inverter controller 1106 may comprise a microcontroller, a Field Programmable Gate Array (FPGA), or an Application Specific Integrated Circuit (ASIC) that may be configured to carry out a set of control instructions.

The example in FIG. 12 illustrates components of power converter 1102 solely for illustration purposes and is not meant to be limiting. Power converter 1102 may comprise multiple intermediate conversion stages (e.g., power converter 1102 may comprise DC-DC-AC-DC-AC conversion stages). The first DC-DC stage may increase the DC voltage generated by a power source 108. The next DC-AC stage may convert the DC voltage to a pulsed voltage and may comprise a transformer for stepping up the pulsed voltage. The pulsed voltage may be rectified in the next AC-DC conversion stage. The rectified voltage may then be converted to a pulsed voltage at a determined frequency (e.g., the grid frequency). The multi-stage power conversion may further include filtering between any one of the above described stages. In some examples, if inverter 1100 receives AC power at input terminals 1101-1 and 1101-2, power converter 1102 may include a rectification stage. Employing multi-stage conversion techniques may reduce the size of magnetic elements (e.g., the transformers). In some examples, the size of the transformer may be reduced by boosting the DC voltage in the DC-DC conversion stage and by switching, in the first DC-AC conversion stage, at a relatively high frequency (e.g., tens of kilohertz, hundreds of kilohertz, or more).

As mentioned above, a power regulation indication may be based one or more determined operational characteristics of power system 100. If central module 101, as depicted in FIGS. 1A and 1B, is an inverter, the determined operational characteristic(s) of power system 100 may indicate one or more determined operational characteristics of inverter 1100. An inverter operational characteristic may be determined inverter input power (e.g., pre-defined in inverter specification or defined by required output power) compared to actual (e.g., measured) inverter input power, determined inverter input voltage compared to actual (e.g., measured) inverter input voltage, or determined inverter input current compared to actual (e.g., measured) inverter input current. A determined inverter operational characteristic may be the determined inverter output voltage compared to actual (e.g., measured) inverter output voltage, determined inverter output current compared to actual (e.g., measured) inverter output current, determined inverter output power compared to actual (e.g., measured) inverter output power, determined inverter voltage gain compared to actual (e.g., measured) inverter voltage gain, or determined inverter current gain compared to actual (e.g., measured) inverter current gain. A determined inverter operational characteristic may be determined inverter transresistance compared to actual (e.g., measured) inverter transresistance or determined inverter transconductance compared to actual (e.g., measured) inverter transconductance.

In the example above, inverter 1100 is described as receiving input power at input terminals 1101-1 and 1101-2 and as providing output power at output terminals 1103-1 and 1103-2. However, according to the disclosure herein, the roles of the input terminals and the output terminals may be reversed. In some examples, terminals 1103-1 and 1103-2 may receive power (e.g., from the grid) and terminals 1101-1 and 1101-2 may provide power to the array of power sinks.

As mentioned above, central module 101 may be a combiner. Reference is now made to FIG. 13, which illustrates an example in which central module 101 may be a combiner. Combiner 1200 may be configured to connect strings 106-1, 106-2, . . . , 106-N in parallel. Combiner 1200 may comprise at least two power busbars 1202-1 and 1202-2. Combiner 1200 may comprise combiner communications module 1206 and combiner controller 1204.

Combiner 1200 may comprise voltage sensor 1208, current sensor 1210, or temperature sensor 1212. Combiner 1200 may comprise fuses 1214-1, 1214-2, . . . , 1214-N, or switches 1216-1, 1216-2, . . . , 1216-N. Combiner 1200 may comprise string current sensors 1218-1, 1218-2, . . . , 1218-N. Combiner communications module 1206, voltage sensor 1208, current sensor 1210, temperature sensor 1212, and string current sensors 1218-1, 118-2, ..., 1218-N may be connected to combiner controller 1204. Combiner communications module 1206 may be similar to inverter communications module 1104, as illustrated in FIG. 12. Voltage sensor 1208 may be similar to output voltage sensor 1112, as illustrated in FIG. 12. Current sensor 1210 may be similar to output current sensor 1114, as illustrated in FIG. 12. Combiner controller 1204 may be configured to control combiner communications module 1206 to transmit a signal to power regulators 110. In some examples, combiner controller 1204 may be configured to control combiner communications module 1206 to receive a signal from power regulators 110. Power busbars 1202-1 and 1202-2 may be configured to connect to a plurality of string output terminals that may exhibit the same (or substantially similar) polarity of a corresponding power bus. Power busbar 1202-1 may connect output terminals 111-11, 111-21, ..., 111-N1 of strings 106-1, 106-2, ..., 106-N, as illustrated in FIGS. 1A and 1B, to output terminals 1222-1 of combiner 1200 via positive power bus 1202-1. Power busbar 1202-2 may connect output terminals 111-12, 111-22, ..., 111-N2 of strings 106-1, 106-2, ..., 106-N, as illustrated in FIGS. 1A and 1B, to output terminal 1222-2 of combiner 1200 via negative power bus 1202-2.

If central module 101 is a combiner, the determined operational characteristics of power system 100 may indicate one or more determined operational characteristics of combiner 1200. A determined combiner operational characteristic may be similar to the determined inverter operational characteristics described above. In the example described above, combiner 1200 is described as receiving input power from terminals 111 and providing output power to output terminals 1211-1 and 1222-2. However, according to the disclosure herein, combiner 1200 may receive power at terminals 1222-1 and 1222-2 and may provide power to terminals 111.

In some examples, both an inverter and a combiner (e.g., inverter 1100 and combiner 1200) may be employed for power regulation of power system 100. For example, combiner 1200 may be configured to regulate the output current of power regulators 110 in strings connected thereto, and inverter 1100 may be configured to regulate the output power between power regulators 110 in power system 100 (e.g., according to techniques described above in conjunction with FIGS. 1A-IC, 2, 3A-3E, 4A-4D, 5, or any combination thereof). If both inverter 1100 and combiner 1200 are employed to regulate power in power system 100, the power regulation may be hierarchical. In a hierarchical system, inverter 1100 may be connected to a plurality of combiners similar to combiner 1200, wherein each combiner may be connected to a plurality of strings 106. In a hierarchical system, each combiner (e.g., combiner 1200) may be configured to regulate the power of the strings (e.g., strings 106) connected thereto according to any one of the options described above. In a hierarchical system, inverter 1100 may be configured to regulate the combiners according to any one of the options described above. In a hierarchical system, inverter 1100 may identify combiners 1200 as power regulators 110.

Power regulator 110 may be implemented using a DC-DC converter. Reference is now made to FIG. 14, which illustrates an example of a power regulator. Power regulator 1300 may comprise a DC-DC converter. Power regulator 1300 may comprise regulator controller 1302, DC-DC converter 1304, and communications module 1306. Communications module 1306 may be a receiver, a transmitter, or a transceiver, similar to regulator communications module 124 illustrated in FIG. 1C. Power regulator 1300 may comprise one or more sensors, such as input voltage sensor 1308, input current sensor 1310, output voltage sensor 1312, output current sensor 1314, or temperature sensor 1316. Each sensor may be connected to regulator controller 1302. Input terminals 1318-1 and 1318-2 of power regulator 1300 may each be connected to a respective DC power source 108. Regulator controller 1302 may be connected to DC-DC converter 1304. Input voltage sensor 1308 may be connected between input terminals 1318-1 and 1318-2. Output voltage sensor 1312 may be connected between output terminals 1320-1 and 1320-2. Input current sensor 1310 may be further connected to input terminal 1318-1. Output current sensor 1314 may be further connected to output terminal 1320-1.

Input voltage sensor 1308 may be configured to measure the voltages between input terminals 1318-1 and 1318-2, and to provide a measurement of the input voltage to regulator controller 1302. Output voltage sensor 1312 may be configured to measure the voltages between output terminals 1320-1 and 1320-2, and to provide a measurement of the output voltage to regulator controller 1302. Input voltage sensor 1308 and output voltage sensor 1312 may comprise a resistive or capacitive divider, a resistive or capacitive bridge, comparators (e.g., employing operational amplifiers), or the like. Input current sensor 1310 may be configured to measure the currents through input 1318-1, and to provide a measurement of the input current to regulator controller 1302. Output current sensor 1314 may be configured to measure the currents through output terminal 1320-1, and to provide a measurement of the output current to regulator controller 1302. Input current sensor 1310 and output current sensor 1314 may comprise a Current Transformer (CT) sensor, Hall effect sensor, zero flux sensor, or the like.

DC-DC converter 1304 may be configured to convert DC input power from the respective DC power source 108 to DC output power at the output terminals 1320-1 and 1320-2 of power regulator 1300. DC-DC converter 1304 may comprise a buck converter, a boost converter, a buck-boost converter, or a buck and boost converter. The output voltage between output terminals 1320-1 and 1320-2 may be controlled using a duty cycle of a corresponding pulse-width modulated (PWM) signal. The duty cycle may be controlled using one or more switches in DC-DC converter 1304.

Communications module 1306 may be configured to receive signals (e.g., communications module 1306 may be a simplex receiver), and to transmit signals (e.g., communications module 1306 may be a half-duplex or full-duplex transceiver). Communications module 1306 may operate according to a communications protocol, and may comprise suitably arranged amplifiers, filters, demodulators, modulators, mixers, analog-to-digital converter (ADC), digital-to-analog converter (DAC), encoders and decoders, and interleavers and deinterleavers. In some examples, communications module 1306 may be a Power Line Communications (PLC) receiver. However, in some examples, communications module 1306 may be a wireless receiver or a line receiver (e.g., a telephone, internet lines, or dedicated lines), and may employ a suitable communications protocols (e.g., ZigBee™, Wi-Fi, Ethernet, or various cellular protocols).

Regulator controller 1302 may be configured to control DC-DC converter 1304 (e.g., by alternatively switching switches thereof, or changing the duty cycle of a PWM signal) to increase, decrease, or maintain one or more of the determined regulator operational characteristics (e.g., output voltage, output current, output power, operating temperature, duty cycle, or any combination thereof) of DC-DC converter 1304. Regulator controller 1302 may be further configured to receive signals from communications module 1306 (e.g., to receive power regulation indications). Regulator controller 1302 may transmit, to communications module 1306, signals relating to (e.g., indicating) power production (e.g., voltages, currents) as well as metadata (e.g., power regulator ID, time, measurements, or the like). Regulator controller 1302 may be implemented based on a microcontroller, a Field Programmable Gate Array (FPGA), or an Application Specific Integrated Circuit (ASIC) that may be configured to execute a set of control instructions.

In the example above, power regulator 1300 is described as receiving input power at input terminals 1318-1 and 1318-2, and as providing output power at output terminals 1320-1 and 1320-2. However, according to the disclosure herein, the roles of the input and output terminals may be reversed. For example, terminals 1320-1 and 1320-2 may receive power (e.g., from the grid) and terminals 1318-1 and 1318-2 may provide power to the corresponding power sink.

Figure 15:
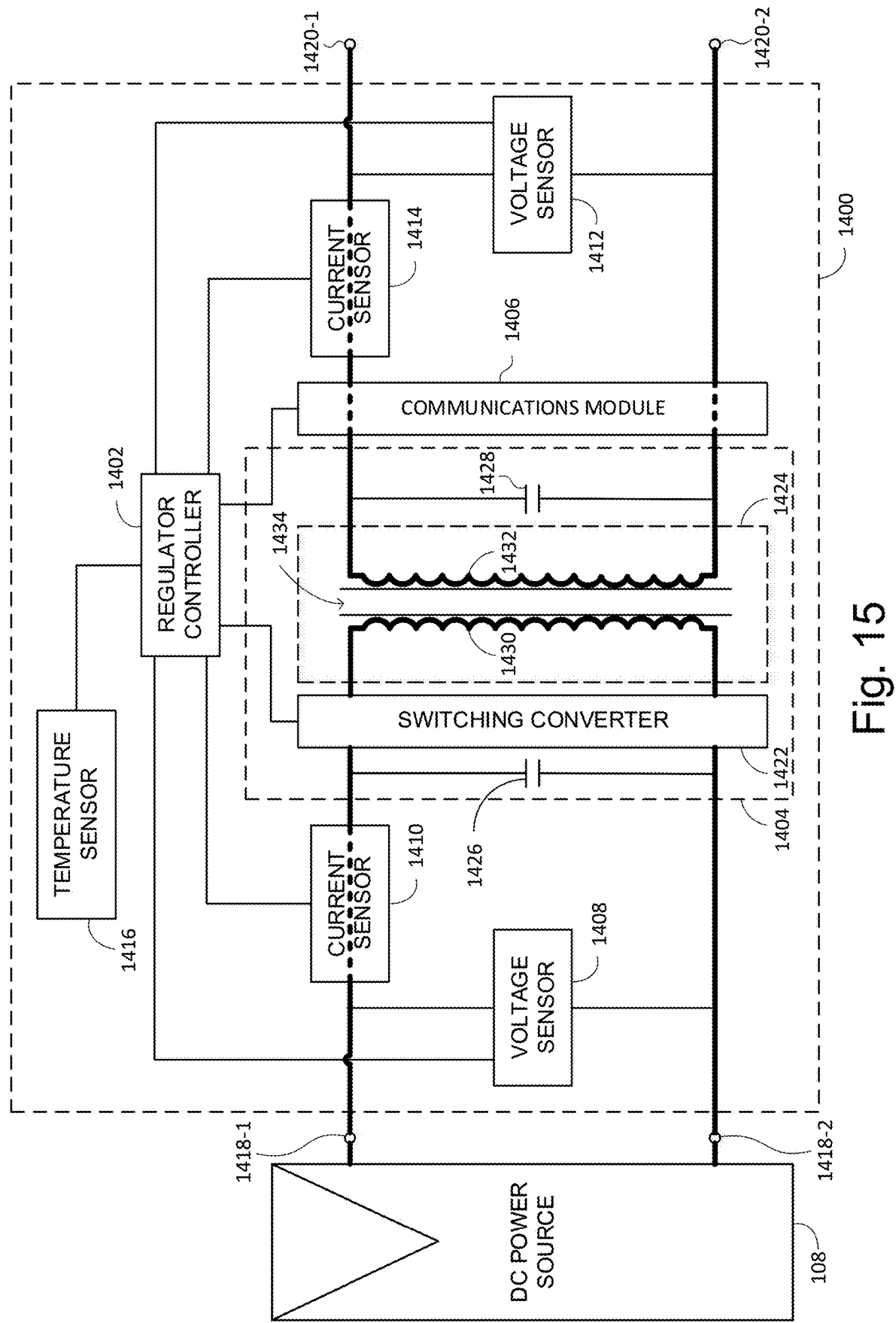
FIG. 15 illustrates an example of a power regulator which comprises a DC-AC converter, in accordance with aspects of the disclosure herein.

In some examples, power regulator 110 may comprise a DC-AC converter. Reference is now made to FIG. 15, which illustrates an example of a power regulator. As illustrated in FIG. 15, power regulator 1400 may comprise a DC-AC converter. Power regulator 1400 may be similar to power regulator 1300 illustrated in FIG. 14, except that power regulator 1400 may comprise DC-AC converter 1404 instead of DC-DC converter 1304.

Power regulator 1400 may comprise regulator controller 1402, DC-AC converter 1404, and communications module 1406. Power regulator 1400 may comprise one or more sensors, such as input voltage sensor 1408, input current sensor 1410, output voltage sensor 1412, output current sensor 1414, or temperature sensor 1416. Each sensor may be connected to regulator controller 1402. Power regulator 1400 may comprise input terminals 1418-1 and 1418-2, and output terminals 1420-1 and 1420-2. DC-AC converter 1404 may comprise switching converter 1422. DC-AC converter 1404 may comprise transformer 1424. DC-AC converter 1404 may comprise input capacitor 1426 or output capacitor 1428. Transformer 1424 may comprise primary windings 1430 and secondary windings 1432. Primary windings 1430 and secondary windings 1432 may be wound around common core 1434. Common core 1434 may comprise of one or more ferromagnetic materials. In some examples, DC-AC converter 1404 might not employ transformer 1424. If DC-AC converter 1404 does not employ transformer 1424, switching converter 1422 may be connected to regulator output terminals 1420-1 and 1420-2.

Input terminals 1418-1 and 1418-2 of power regulator 1400 may be connected to a respective DC power source 108. Regulator controller 1402 may be connected to DC-AC converter 1422. Input voltage sensor 1408 may be connected between input terminals 1418-1 and 1418-2. Output voltage sensor 1412 may be connected between output terminals 1420-1 and 1420-2. Input current sensor 1410 may be connected to input terminal 1418-1. Output current sensor 1414 may be connected to output terminal 1420-1.

DC-AC converter 1404 may be similar to DC-AC converter 1120 illustrated in FIG. 12. Regulator controller 1402 may be configured to control switching converter 1422. Switching converter 1422 may be configured to generate a pulsed output voltage (e.g., a square-wave or a stepped pulsed wave) at the output of switching converter 1422.

Transformer 1424 of DC-AC converter 1404 may be similar to transformer 1122 illustrated in FIG. 12. Transformer 1424 may be a step-up transformer in which the number of windings in secondary windings 1432 may be larger than the number of windings in primary windings 1430. Transformer 1424 may be a step-down transformer in which the number of windings in secondary windings 1432 may be smaller than the number of windings in primary windings 1430. Transformer 1424 may provide galvanic isolation between converter input terminals 1418-1 and 1418-2, and between converter output terminals 1420-1 and 1420-2. At least one of primary windings 1430 or secondary windings 1430 may be encapsulated in a resin, such as epoxy. Primary windings 1430 and secondary windings 1432 may be wound around common core 1434, which may comprise ferromagnetic materials. In some examples, primary windings 1430 and secondary windings 1432 may each comprise bifilar windings and, as such, each one of primary windings 1430 and secondary windings 1432 may be wound around a different leg of common core 1434. In operation of DC-AC converter 1404, switching converter 1422 may receive DC voltage at inverter input terminals 1418-1 and 1418-2. Input capacitor 1426 may stabilize the voltage across inverter input terminals 1418-1 and 1418-2. Switching converter 1422 may generate a pulsed output voltage (e.g., a square-wave or a stepped pulsed wave-similar to switching converter 1120 in FIG. 12) at the input of transformer 1424. Transformer 1424 may step-up, step-down, or maintain the voltage generated by switching converter 1422. Output capacitor 1428 may filter the output of transformer 1424 to generate an AC voltage across inverter output terminals 1420-1 and 1420-2.

Communications module 1406 may be configured to receive signals (e.g., communications module 1406 may be a simplex receiver), and to transmit signals (e.g., communications module 1406 may be a half-duplex or full-duplex transceiver). Communications module 1406 may operate according to a communications protocol, and may comprise suitably arranged amplifiers, filters, demodulators, modulators, mixers, analog-to-digital converter (ADC), digital-to-analog converter (DAC), encoders and decoders, and interleavers and deinterleavers. In some examples, communications module 1406 may be a Power Line Communications (PLC) receiver. In some examples, communications module 1406 may be a wireless receiver or a line receiver (e.g., a telephone, internet lines, or dedicated lines), and may employ a suitable communications protocol (e.g., ZigBee™, Wi-Fi, Ethernet, or various cellular protocols).

Regulator controller 1402 may be configured to control DC-AC converter 1404 (e.g., by alternatively switching switches in switching converter 1422 or by changing the duty cycle of a PWM signal). Regulator controller 1402 may be further configured to receive signals from communications module 1406 (e.g., to receive power regulation indications). Regulator controller 1402 may transmit, to communications module 1406, signals relating to (e.g., indicating) power production (e.g., voltages, currents) as well as metadata (e.g., power regulator ID, time, measurements, or the like). Regulator controller 1402 may be implemented based on a microcontroller, a Field Programmable Gate Array (FPGA), or an Application Specific Integrated Circuit (ASIC) that may be configured to carry out a set of control instructions.

In the example described above, power regulator 1400 is described as receiving input power at input terminals 1418-1 and 1418-2 and as providing output power at output terminals 1420-1 and 1420-2. In some examples, the roles of the input and output terminals may be reversed. In some examples, terminals 1420-1 and 1420-2 may receive power (e.g., from the grid) and terminals 1418-1 and 1418-2 may provide power to the corresponding power sink.

A system may comprise a plurality of power sources configured to generate power, and a plurality of power regulators, wherein each power regulator of the plurality of power regulators comprises: a power converter configured to convert input power from a corresponding one of the plurality of power sources to output power, a regulator transceiver configured to receive at least one power regulation signal, wherein the at least one power regulation signal is associated with regulating an operational characteristic of the power regulator, wherein the at least one power regulation signal is one of a broadcast signal or a multicast signal, and a regulator controller connected to the power converter and the regulator transceiver, and configured to, based on the at least one power regulation signal and based on a power production characteristic of the power regulator, control the power converter to increase or decrease a magnitude of the operational characteristic of the power regulator. The system may further comprise a central circuit, wherein the central circuit comprises: a sensor configured to measure at least one of an input voltage, an input current, an output voltage, an output current, or an operating temperature of the central circuit, a central controller configured to: determine an operational characteristic of the central circuit based on a measurement from the sensor, and determine the power regulation signal based on the determined operational characteristic of the central circuit, and a central transceiver connected to the central controller, configured to transmit the power regulation signal to at least one power regulator of the plurality of power regulators. The operational characteristic of the central circuit may be based on at least one of: a difference or a ratio between a predetermined input voltage and a measured input voltage, a difference or a ratio between a predetermined input current and a measured input current, a difference or a ratio between a predetermined input power and a measured input power, a difference or a ratio between a predetermined output voltage and a measured output voltage, a difference or a ratio between a predetermined output current and a measured output current, a difference or a ratio between a predetermined output power and a measured output power, a difference or a ratio between a predetermined voltage gain and a measured voltage gain, a difference or a ratio between a predetermined current gain and a measured current gain, a difference or a ratio between a predetermined transresistance and a measured transresistance, or a difference or a ratio between a predetermined transconductance and a measured transconductance.

The power regulation signal comprises a change indication. Each power regulator of the plurality of power regulators may be further configured to control its operational characteristic to increase or decrease the magnitude of the operational characteristic of the power regulator based on the change indication and a corresponding one of an increase function, or a decrease function. The power production characteristic of each power regulator of the plurality of power regulators comprises at least one of: a Maximum Power Point (MPP) of the corresponding one of the plurality of power sources, a current versus voltage characteristic of the corresponding power source of the plurality of power sources, the increase function, the decrease function, or an operating temperature. The central circuit may comprise power busbars configured to combine outputs of the plurality of power regulators. The power regulation signal may be transmitted, from a central circuit, as the broadcast signal or the multicast signal to each power regulator of the plurality of power regulators. The operational characteristic of each power regulator of the plurality of power regulators may comprise at least one of an output voltage, an output current, an output power, an operating temperature, a duty cycle, an input voltage, an input current, an input power, a lifetime, or a frequency. Each power regulator of the plurality of power regulators may further comprise a sensor connected to the regulator controller, wherein the sensor is configured to measure at least one of an input voltage, an input current, an output voltage, an output current, or an operating temperature of the power regulator, and wherein the regulator controller is further configured to control the power converter based on a measurement from the sensor. Each power regulator of the plurality of power regulators may store a characteristic curve defining a relationship between at least two operational characteristics of the power regulator, wherein, the characteristic curve comprises a droop over an operating range of the power regulator, and wherein the regulator controller is further configured to control the power converter to increase, decrease, or maintain magnitudes of the operational characteristics of the power regulator based on the characteristic curve. The power converter, of each power regulator of the plurality of power regulators, may be a direct current (DC) to direct current (DC-to-DC) converter or a DC to alternating current (DC-to-AC) converter comprising at least a switching converter. The plurality of power regulators, connected in series or in parallel, may form a plurality of strings, wherein each of the plurality of strings comprises a subset of the plurality of power regulators, and wherein each power regulator of the subset is configured to: connect, via input terminals, to the corresponding one of the plurality of power sources, and provide, via output terminals, the output power.

A method may comprise determining, by a central circuit, a power regulation signal, transmitting, by a transceiver of the central circuit and to at least one power regulator of a plurality of power regulators, the power regulation signal as a broadcast signal or a multicast signal, and based on the power regulation signal transmitted and based on a power production characteristic of the at least one power regulator, causing, by the central circuit, the at least one power regulator to increase or decrease a magnitude of an operational characteristic of the at least one power regulator. The method may further comprise, causing the at least one power regulator to maintain the magnitude of the operational characteristic of the at least one power regulator. The causing the at least one power regulator may comprise, based on a corresponding increase function or a decrease function of the at least one power regulator, increasing or decreasing the magnitude of the operational characteristic of the at least one power regulator. The power production characteristic of the at least one power regulator comprises at least one of: a Maximum Power Point (MPP) of a power source of a plurality of power sources, a current versus voltage characteristic of the power source, the increase function, the decrease function, or an operating temperature. The determining the power regulation signal may comprises determining a change to an input of the central circuit based on a determined operational characteristic of a power system associated with the plurality of power regulators and a plurality of power sources, and based on the determined change to the input of the central circuit, determining a change indication indicating a ratio of change or an amount of change in the magnitude of the operational characteristic of the at least one power regulator. The operational characteristic of the at least one power regulator may be at least one of an output voltage, an output current, an output power, an operating temperature, a duty cycle, an input voltage, an input current, an input power, a lifetime, or a frequency. The causing the at least one power regulator to control may be further based on a characteristic curve, wherein the characteristic curve may indicate a relationship between at least two operational characteristics of the at least one power regulator of the plurality of power regulators, and wherein the characteristic curve may comprise a droop over an operating range of the at least one power regulator.

One or more aspects of the present disclosure may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), or the like. Particular data structures may be used to more effectively implement one or more aspects of the disclosure, and such data structures may be within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
   a plurality of power regulators, wherein each power regulator of the plurality of power regulators has a respective operational characteristic, and wherein each power regulator comprises:
   a power converter configured to convert input power from a respective one of a plurality of power sources to output power; and
   a regulator controller connected to the power converter and configured to, based on differences between the respective operational characteristics of the plurality of power regulators, and based on a power production characteristic of the power regulator, control the power converter to change the operational characteristic of the power regulator.

2. The system of claim 1, wherein each power regulator of the plurality of power regulators is further configured to change, based on an increase function or a decrease function of the power regulator, the operational characteristic of the power regulator.

3. The system of claim 2, wherein the power production characteristic of each power regulator of the plurality of power regulators comprises at least one of:
   a Maximum Power Point (MPP) of the respective one of the plurality of power sources;
   a current versus voltage characteristic of the one of the plurality of power sources;
   the increase function;
   the decrease function; or
   an operating temperature.

4. The system of claim 1, wherein the operational characteristic of each power regulator of the plurality of power regulators comprises at least one of:
   an output voltage;
   an output current;
   an output power;
   an operating temperature;
   a duty cycle, an input voltage;
   an input current;
   an input power;
   a lifetime; or
   a frequency.

5. The system of claim 1, wherein each power regulator of the plurality of power regulators further comprises a sensor connected to the regulator controller, wherein the sensor is configured to measure at least one of an input voltage, an input current, an output voltage, an output current, or an operating temperature of the power regulator, and
   wherein the regulator controller is further configured to control, based on a measurement from the sensor, the power converter.

6. The system of claim 1, wherein each power regulator of the plurality of power regulators stores a characteristic curve defining a relationship between at least two operational characteristics of the power regulator,
   wherein, the characteristic curve comprises a droop over an operating range of the power regulator, and
   wherein the regulator controller is further configured to control, based on the characteristic curve, the power converter to change or maintain magnitudes of the at least two operational characteristics of the power regulator.

7. The system of claim 1, wherein the power converter, of each power regulator of the plurality of power regulators, is:
   a direct current (DC) to direct current (DC-to-DC) converter; or
   a DC to alternating current (DC-to-AC) converter.

8. The system of claim 1, wherein the plurality of power regulators, connected in series or in parallel, form a plurality of strings, wherein each of the plurality of strings comprises a subset of the plurality of power regulators, and wherein each power regulator of the subset is configured to:
   connect, via input terminals, to the respective one of the plurality of power sources; and
   provide, via output terminals, the output power.

9. The system of claim 1, wherein each power regulator of the plurality of power regulators further comprises a regulator transceiver configured to receive at least one power regulation signal, wherein the at least one power regulation signal is associated with regulating the operational characteristic of the power regulator,
   wherein the at least one power regulation signal is one of a broadcast signal or a multicast signal.

10. The system of claim 9, wherein the regulator controller is further configured to control the power converter to change, based on the at least one power regulation signal, the operational characteristic of the power regulator.

11. The system of claim 9, wherein the power regulation signal comprises a change indication.

12. The system of claim 9, further comprising a central circuit, wherein the central circuit comprises:
   a sensor configured to measure at least one of an input voltage, an input current, an output voltage, an output current, or an operating temperature of the central circuit;

a central controller configured to:
  determine, based on a measurement from the sensor, an operational characteristic of the central circuit;
  determine, based on the determined operational characteristic of the central circuit, the power regulation signal; and
a central transceiver connected to the central controller and configured to transmit the power regulation signal to at least one power regulator of the plurality of power regulators.

13. The system of claim 12, wherein the central circuit comprises power busbars configured to combine outputs of the plurality of power regulators.

14. The system of claim 12, wherein the power regulation signal is transmitted, from the central circuit, as the broadcast signal or the multicast signal to each power regulator of the plurality of power regulators.

15. The system of claim 12, wherein the operational characteristic of the central circuit is based on at least one of:
  a difference or a ratio between a predetermined input voltage and a measured input voltage;
  a difference or a ratio between a predetermined input current and a measured input current;
  a difference or a ratio between a predetermined input power and a measured input power;
  a difference or a ratio between a predetermined output voltage and a measured output voltage;
  a difference or a ratio between a predetermined output current and a measured output current;
  a difference or a ratio between a predetermined output power and a measured output power;
  a difference or a ratio between a predetermined voltage gain and a measured voltage gain;
  a difference or a ratio between a predetermined current gain and a measured current gain;
  a difference or a ratio between a predetermined transresistance and a measured transresistance; or
  a difference or a ratio between a predetermined transconductance and a measured transconductance.

16. A method comprising:
  detecting, by each power regulator of a plurality of power regulators, a respective operational characteristic of the power regulator;
  detecting, by each power regulator of the plurality of power regulators, a respective power production characteristic of the power regulator; and
  controlling, by each power regulator of the plurality of power regulators, based on differences between the respective operational characteristics of the plurality of power regulators, and based on the respective power production characteristic of the power regulator, a power converter of the power regulator to change the respective operational characteristic of the power regulator.

17. The method of claim 16, wherein the controlling, by each power regulator of the plurality of power regulators, of the power converter is based on an increase function or a decrease function of the power regulator.

18. The method of claim 17, wherein the respective power production characteristic of the power regulator of the plurality of power regulators comprises at least one of:
  a Maximum Power Point (MPP) of a power source of a plurality of power sources;
  a current versus voltage characteristic of the power source;
  the increase function;
  the decrease function; or
  an operating temperature.

19. The method of claim 16, wherein the operational characteristic is at least one of:
  an output voltage;
  an output current;
  an output power;
  an operating temperature;
  a duty cycle;
  an input voltage;
  an input current;
  an input power;
  a lifetime; or
  a frequency.

20. The method of claim 16, wherein the controlling the power converter is further based on a characteristic curve, wherein the characteristic curve indicates a relationship between at least two operational characteristics of the power regulator of the plurality of power regulators, and wherein the characteristic curve comprises a droop over an operating range of the power regulator.

* * * * *